(12) United States Patent
Simonsen et al.

(10) Patent No.: US 12,098,088 B2
(45) Date of Patent: *Sep. 24, 2024

(54) ELEMENT FOR A PREFORM, A FIBER PRODUCTION METHOD AND AN OPTICAL FIBER DRAWN FROM THE PREFORM

(71) Applicant: NKT Photonics A/S, Birkerød (DK)

(72) Inventors: Harald Roager Simonsen, Lejre (DK); Christian Jakobsen, Virum (DK)

(73) Assignee: NKT Photonics A/S, Birkerød (DK)

( * ) Notice: Subject to any disclaimer, the term of this patent is extended or adjusted under 35 U.S.C. 154(b) by 34 days.

This patent is subject to a terminal disclaimer.

(21) Appl. No.: 17/356,620

(22) Filed: Jun. 24, 2021

(65) Prior Publication Data

US 2021/0323856 A1 Oct. 21, 2021

Related U.S. Application Data

(63) Continuation of application No. 15/774,780, filed as application No. PCT/DK2016/050364 on Nov. 10, 2016, now Pat. No. 11,072,554.

(30) Foreign Application Priority Data

Nov. 10, 2015 (DK) .......................... PA 2015 70724

(51) Int. Cl.
*C03B 37/012* (2006.01)
*C03B 37/025* (2006.01)
(Continued)

(52) U.S. Cl.
CPC ........ *C03B 37/0122* (2013.01); *C03B 37/012* (2013.01); *C03B 37/01211* (2013.01);
(Continued)

(58) Field of Classification Search
None
See application file for complete search history.

(56) References Cited

U.S. PATENT DOCUMENTS 3,990,874 A 11/1976 Schulman
4,551,162 A 11/1985 Hicks
(Continued)

FOREIGN PATENT DOCUMENTS

CN 1269020 A 10/2000
CN 1649801 A 8/2005
(Continued)

OTHER PUBLICATIONS

JP-2012036052-A Machine Translation Provided by Clarivate Analytics Retrieved Mar. 15, 2024. (Year: 2024).*
(Continued)

*Primary Examiner* — Lisa L Herring
(74) *Attorney, Agent, or Firm* — Hamilton, Brook, Smith & Reynolds, P.C.

(57) ABSTRACT

A preform element, its production, and fiber production methods from preform assemblies. The preform element has a length and a center axis along its length, a first and second end defined by its length and an outer preform element surface. The preform element includes a plurality of longitudinal structures disposed to form longitudinal hole(s) in a background material. At least one slot extending from its outer preform element surface and intersecting at least one of the longitudinal holes, wherein the at least one slot does not fully intersect the preform element. The preform element may be a preform center element or a preform ring element and may be assembled to a form part of a preform assembly for an optical fiber.

19 Claims, 20 Drawing Sheets

(51) Int. Cl.
  *C03B 37/027* (2006.01)
  *G02B 6/032* (2006.01)
  *G02B 6/02* (2006.01)
(52) U.S. Cl.
  CPC .... *C03B 37/01217* (2013.01); *C03B 37/0253* (2013.01); *C03B 37/02709* (2013.01); *C03B 37/02781* (2013.01); *C03B 37/0279* (2013.01); *G02B 6/032* (2013.01); *C03B 2203/12* (2013.01); *C03B 2203/14* (2013.01); *C03B 2203/30* (2013.01); *C03B 2203/42* (2013.01); *C03B 2205/08* (2013.01); *C03B 2205/10* (2013.01); *G02B 6/02361* (2013.01); *G02B 6/02366* (2013.01)

(56) References Cited

U.S. PATENT DOCUMENTS

| | | | |
|---|---|---|---|
| 4,575,181 | A | 3/1986 | Ishikawa |
| 4,737,011 | A | 4/1988 | Iri et al. |
| 5,018,821 | A | 5/1991 | Kurata |
| 5,210,816 | A | 5/1993 | Iino et al. |
| 5,291,570 | A | 3/1994 | Filgas et al. |
| 5,960,139 | A | 9/1999 | Henning |
| 6,334,019 | B1 | 12/2001 | Birks et al. |
| 6,347,178 | B1 | 2/2002 | Edwards et al. |
| 6,795,635 | B1 | 9/2004 | Fajardo et al. |
| 6,888,992 | B2 | 5/2005 | Russell et al. |
| 6,892,018 | B2 | 5/2005 | Libori et al. |
| 6,954,574 | B1 | 10/2005 | Russell et al. |
| 6,985,661 | B1 | 1/2006 | Russell et al. |
| 7,242,835 | B2 | 7/2007 | Busse et al. |
| 7,306,376 | B2 | 12/2007 | Scerbak et al. |
| 7,321,712 | B2 | 1/2008 | Williams et al. |
| 7,373,062 | B2 | 5/2008 | Huber |
| 7,792,408 | B2 | 9/2010 | Varming |
| 7,793,521 | B2 | 9/2010 | Gallagher et al. |
| 8,215,129 | B2 | 7/2012 | Russell et al. |
| 8,306,379 | B2 | 11/2012 | Benabid et al. |
| 8,393,804 | B2 | 3/2013 | Nielson et al. |
| 8,854,728 | B1 | 10/2014 | Brooks et al. |
| 8,938,146 | B2 | 1/2015 | Lyngse et al. |
| 10,139,560 | B2 | 11/2018 | Poletti et al. |
| 10,527,782 | B2 | 1/2020 | Lyngsøe et al. |
| 10,551,574 | B2 | 2/2020 | Alkeskjold et al. |
| 10,989,866 | B2 | 4/2021 | Lyngsøe et al. |
| 11,002,919 | B2 | 5/2021 | Alkeskjold et al. |
| 11,072,554 | B2 | 7/2021 | Simonsen et al. |
| 11,360,274 | B2 | 6/2022 | Alkeskjold et al. |
| 11,474,293 | B2 | 10/2022 | Lyngsoe et al. |
| 11,662,518 | B2 | 5/2023 | Jakobsen |
| 11,846,809 | B2 | 12/2023 | Alkeskjold et al. |
| 11,977,255 | B2 | 5/2024 | Lyngsøe et al. |
| 2002/0118938 | A1 | 8/2002 | Hasegawa et al. |
| 2002/0122644 | A1 | 9/2002 | Birks et al. |
| 2002/0159734 | A1 | 10/2002 | Sasaoka et al. |
| 2003/0068150 | A1 | 4/2003 | Ariel et al. |
| 2003/0230118 | A1 | 12/2003 | Dawes et al. |
| 2005/0185908 | A1 | 8/2005 | Roberts et al. |
| 2005/0232560 | A1* | 10/2005 | Knight .............. C03B 37/02781 385/125 |
| 2005/0233301 | A1 | 10/2005 | Berd et al. |
| 2005/0238301 | A1 | 10/2005 | Russell et al. |
| 2005/0286847 | A1 | 12/2005 | Arimondi et al. |
| 2006/0130528 | A1 | 6/2006 | Nelson et al. |
| 2006/0193583 | A1 | 8/2006 | Dong et al. |
| 2007/0009216 | A1 | 1/2007 | Russell et al. |
| 2007/0204656 | A1 | 9/2007 | Gallagher et al. |
| 2007/0237453 | A1 | 10/2007 | Nielsen et al. |
| 2007/0292087 | A1 | 12/2007 | Brown |
| 2008/0310806 | A1 | 12/2008 | Mukasa |
| 2009/0252459 | A1 | 10/2009 | Nielson et al. |
| 2009/0320526 | A1 | 12/2009 | Carberry et al. |
| 2010/0124393 | A1 | 5/2010 | Li et al. |
| 2010/0132406 | A1 | 6/2010 | Huenermann |
| 2010/0135616 | A1 | 6/2010 | Watte et al. |
| 2010/0303429 | A1 | 12/2010 | Gibson et al. |
| 2010/0326139 | A1* | 12/2010 | Sugizaki ........... C03B 37/01234 65/412 |
| 2011/0013652 | A1 | 1/2011 | Knight et al. |
| 2011/0194816 | A1 | 8/2011 | Kumkar et al. |
| 2011/0195515 | A1 | 8/2011 | Beat et al. |
| 2012/0141079 | A1 | 6/2012 | Gibson et al. |
| 2013/0208737 | A1 | 8/2013 | Clowes et al. |
| 2014/0029896 | A1 | 1/2014 | Zheng et al. |
| 2014/0211818 | A1 | 7/2014 | Hou et al. |
| 2015/0192732 | A1 | 7/2015 | Moselund |
| 2017/0097464 | A1 | 4/2017 | Challener et al. |
| 2017/0160467 | A1 | 6/2017 | Poletti et al. |
| 2018/0267235 | A1 | 9/2018 | Russell et al. |
| 2018/0339931 | A1 | 11/2018 | Simonsen et al. |
| 2018/0372961 | A1 | 12/2018 | Alkeskjold et al. |
| 2019/0011634 | A1 | 1/2019 | Lyngsøe et al. |
| 2019/0101695 | A1 | 4/2019 | Poletti et al. |
| 2019/0135679 | A1 | 5/2019 | Jakobsen et al. |
| 2020/0103587 | A1 | 4/2020 | Lyngsøe et al. |
| 2020/0166699 | A1 | 5/2020 | Bauerschmidt et al. |
| 2020/0310039 | A1 | 10/2020 | Alkeskjold et al. |
| 2021/0341682 | A1 | 11/2021 | Alkeskjold et al. |
| 2022/0011501 | A1 | 1/2022 | Lyngsøe et al. |
| 2022/0269012 | A1 | 8/2022 | Alkeskjold et al. |
| 2023/0018465 | A1 | 1/2023 | Lyngsøe et al. |
| 2023/0185019 | A1 | 6/2023 | Campbell et al. |
| 2023/0273366 | A1 | 8/2023 | Lyngsøe et al. |
| 2024/0053545 | A1 | 2/2024 | Alkeskjold et al. |
| 2024/0201434 | A1 | 6/2024 | Lyngsçe et al. |

FOREIGN PATENT DOCUMENTS

| | | |
|---|---|---|
| CN | 101122651 A | 2/2008 |
| CN | 101210977 A | 7/2008 |
| CN | 101426743 A | 5/2009 |
| CN | 101779149 A | 7/2010 |
| CN | 102066996 A | 5/2011 |
| CN | 201845110 U | 5/2011 |
| CN | 102815864 A | 12/2012 |
| CN | 103823277 A | 5/2014 |
| CN | 104078124 A | 10/2014 |
| CN | 104297839 A | 1/2015 |
| CN | 104568841 A | 4/2015 |
| EP | 1096285 A2 | 5/2001 |
| EP | 1495260 B1 | 9/2008 |
| EP | 2322489 A1 | 5/2011 |
| EP | 2479594 A1 | 7/2012 |
| EP | 2533081 A1 | 12/2012 |
| EP | 3374322 A4 | 9/2018 |
| GB | 2097149 A | 10/1982 |
| GB | 2255199 A | 10/1992 |
| GB | 2387666 A | 10/2003 |
| GB | 2518420 A | 3/2015 |
| JP | H0186104 U | 6/1987 |
| JP | S62178203 A | 8/1987 |
| JP | S6486104 A | 3/1989 |
| JP | H052118 A | 1/1993 |
| JP | H0792355 A | 4/1995 |
| JP | 2000180660 A | 6/2000 |
| JP | 2001-086104 A | 3/2001 |
| JP | 2001166176 A | 6/2001 |
| JP | 2001318244 A | 11/2001 |
| JP | 2002-506533 A | 2/2002 |
| JP | 2002-323625 A | 11/2002 |
| JP | 2003107281 A | 4/2003 |
| JP | 2003107294 A | 4/2003 |
| JP | 2003279758 A | 10/2003 |
| JP | 2004077979 A | 3/2004 |
| JP | 2004191947 A | 7/2004 |
| JP | 2004339004 A | 12/2004 |
| JP | 2005043638 A | 2/2005 |
| JP | 2006039147 A | 2/2006 |
| JP | 2006276882 A | 10/2006 |
| JP | 2008020741 A | 1/2008 |
| JP | 2009-007201 A | 1/2009 |
| JP | 2009116193 A | 5/2009 |
| JP | 2009528248 A | 8/2009 |

(56) References Cited

FOREIGN PATENT DOCUMENTS

| | | | | |
|---|---|---|---|---|
| JP | 2010215458 A | 9/2010 | | |
| JP | 2011-107687 A | 6/2011 | | |
| JP | 2011526704 A | 10/2011 | | |
| JP | 2011232706 A | 11/2011 | | |
| JP | 2012036052 A | * 2/2012 | ......... | C03B 37/0122 |
| JP | 2018-045110 A | 3/2018 | | |
| JP | 2019-504350 A | 2/2019 | | |
| WO | 99/00685 A1 | 1/1999 | | |
| WO | 9935524 A2 | 7/1999 | | |
| WO | 0146734 A1 | 6/2001 | | |
| WO | 03078338 A2 | 9/2003 | | |
| WO | 03/87666 A1 | 10/2003 | | |
| WO | 03080524 A1 | 10/2003 | | |
| WO | 2004/083918 A1 | 9/2004 | | |
| WO | 2004083919 A1 | 9/2004 | | |
| WO | 2005012197 A2 | 2/2005 | | |
| WO | 2005091029 A2 | 9/2005 | | |
| WO | 2006072025 A2 | 7/2006 | | |
| WO | 2007106305 A2 | 9/2007 | | |
| WO | 2009010317 A1 | 1/2009 | | |
| WO | 2009157977 A1 | 12/2009 | | |
| WO | 2010084964 A1 | 7/2010 | | |
| WO | 2012168400 A1 | 12/2012 | | |
| WO | 2013168400 A2 | 11/2013 | | |
| WO | 2015003714 A1 | 1/2015 | | |
| WO | 2015003715 A1 | 1/2015 | | |
| WO | 2015144181 A1 | 10/2015 | | |
| WO | 2015185761 A1 | 12/2015 | | |
| WO | 2017080564 A1 | 5/2017 | | |
| WO | 2017/108060 A1 | 6/2017 | | |
| WO | 2017108061 A1 | 6/2017 | | |

OTHER PUBLICATIONS

Notice of Allowance (Decision to Grant a Patent) issued on Jan. 25, 2022, in Japanese Patent Application No. 2018-523498 and an English Translation of the Notice of Allowance. (8 pages).
Office Action (The Third Office Action) issued on Dec. 14, 2021, by the State Intellectual Property Office of the People's Republic of China in corresponding Chinese Patent Application No. 201680078462. 2, and an English Translation of the Office Action. (7 pages).
Office Action (Decision of Refusal) issued on Aug. 5, 2021, by the Japanese Patent Office in corresponding Japanese Patent Application No. 2018-523498, and an English Translation of the Office Action. (10 pages).
Examination Report issued on Sep. 8, 2020 by the Intellectual Property Office of Singapore in corresponding Singapore Patent Application No. 11201804738S, (4 pages).
International Search Report (Form PCT/ISA/210) issued on Jun. 30, 2017, by the Danish Patent Office in corresponding International Application No. PCT/DK2017/050127. (8 pages).
International Search Report (PCT/ISA/210) mailed on Jun. 30, 2017, by the Norwegian Patent Office as the International Searching Authority for International Application No. PCT/DK2017/050127.
Office Action (Communication pursuant to Article 94(3) EPC) issued on Oct. 5, 2020, by the European Patent Office in corresponding European Application No. 16 863 710.6-1105. (5 pages).
Office Action (First Office Action) issued on Sep. 8, 2020 by the China National Intellectual Property Administration in corresponding Chinese Patent Application No. 201680078462.2 and an English Translation of the Office Action. (43 pages).
Office Action (Notice of Reasons for Rejection) issued on Dec. 8, 2020, by the Japanese Patent Office in corresponding Japanese Patent Application No. 2018-523498, and an English Translation of the Office Action. (7 pages).
Office Action issued on Nov. 24, 2020, by the Japanese Patent Office in corresponding Japanese Patent Application No. 2018-532462, (6 pages).
Search Report and Search Opinion issued on Jun. 2, 2016, by Danish Patent and Trademark Office in corresponding Application No. PA 2015 70876, 6 pages.
Search Report issued on Jun. 3, 2018, by the Danish Patent and Trademark Office in corresponding Application No. PA 2015 70724. (5 pages).
Search Report mailed on Jun. 30, 2016 by the Danish Patent and Trademark Office in corresponding Application No. PA 2015 70877, 4 pages.
The extended European Search Report issued on Jul. 9, 2019, by the European Patent Office in European Patent Application No. 16877822. 3-1003. (12 pages).
The extended European Search Report issued on May 28, 2019, by the European Patent Office in European Patent Application No. 16863710.6-1105. (8 pages).
Written Opinion (PCT/ISA/237) mailed on Jun. 30, 2017, by the Norwegian Patent Office as the International Searching Authority for International Application No. PCT/DK2017/050127.
Written Opinion issued on Dec. 28, 2020, by the Intellectual Property Office of Singapore in corresponding Singapore Patent Application No. 11201803838T, (6 pages).
Written Opinion issued on Oct. 10, 2019, by the Intellectual Property Office of Singapore in corresponding Singapore Patent Application No. 11201803838T, (8 pages).
Written Opinion of the International Searching Authority (PCT/ISA/237) mailed on Jun. 30, 2017, by the Danish Patent Office for the International Application No. PCT/DK2017/050127. (10 pages).
International Search Report (PCT/ISA/210) mailed on Mar. 3, 2017, by the Denmark Patent Office as the International Searching Authority for International Application No. PCT/DK2016/050460, Mar. 3, 2017.
Written Opinion (PCT/ISA/237) mailed on Mar. 3, 2017, by the Denmark Patent Office as the International Searching Authority for International Application No. PCT /DK2016/050460, Mar. 3, 2017.
Written Opinion issued on Oct. 4, 2019, by the Intellectual Property Office of Singapore in corresponding Singapore Patent Application No. 11201804707Y, (8 pages).
Office Action (Non-Final) in U.S. Appl. No. 15/774,780, 26 pages.
Belardi, W., "Design and properties of hollow antiresonant fibers for the visible and near infrared spectral range", arXiv (Jan. 2015); doi: 10.1364/OE.23.017394.
Office Action (First Office Action) issued on Oct. 12, 2019, in the corresponding Chinese Patent Application No. 201680075502.8, 29 pages.
Office Action (Second Office Action) issued on Apr. 8, 2020, in the corresponding Chinese Patent Application No. 201680075502.8, 7 pages.
Office Action (First Office Action) issued on Oct. 8, 2019, in the corresponding Chinese Patent Application No. 201680075508.5, 13 pages.
Office Action (Second Office Action) issued on Jun. 9, 2020, in the corresponding Chinese Patent Application No. 201680075508.5, 12 pages.
Office Action issued on Jun. 17, 2020 in corresponding European Patent Application No. 16877822.3, 7 pages.
Günendi, M. C., et al., "Broad-band robustly single-mode hollow-core PCF by resonant filtering of higher order modes", 7 pages.
Habib, Md. S., et al., "Low-loss hollow-core silica fibers with adjacent nested anti-resonant tubes", vol. 23, No. 13, Optics Express, Jun. 24, 2015, 13 pages.
Kolyadin, A., et al., "Light transmission in negative curvature hollow core fiber in extremely high material loss region", Opt. Express vol. 21, No. 8, 9514-9519, Apr. 10, 2013, 6 pages.
Kolyadin, A. N., et al., "Negative curvature hollow-core fibers: dispersion properties and femtosecond pulse delivery", Elsevier—Physics Procedia, vol. 73, 2015, pp. 59-66.
Poletti, F., "Nested antiresonant nodeless hollow core fiber", vol. 22, No. 20, Opt. Express, Sep. 22, 2014, 22 pages.
Sorensen, T., et al., "Metal-assisted coupling to hollow-core photonic crystal fibres", Electronics Letters, vol. 41 No. 12, Jun. 9, 2005, 2 pages.
Vincetti L., et al., "Waveguiding mechanism in tube lattice fibers", vol. 18, No. 22, Optics Express, Oct. 25, 2010, 14 pages.
Extended European Search Report issued on Jul. 23, 2019 in the corresponding European Patent Application No. 16877821.5, 11 pages.

(56) References Cited

OTHER PUBLICATIONS

Extended European Search Report issued on Dec. 4, 2019 in the corresponding European Patent Application No. EP 17788848.4-1105, 8 pages.
Written Opinion issued on Oct. 7, 2019 in the corresponding Singapore Patent Application No. SG 11201804738S, 8 pages.
Office Action (Second Office Action) issued on Jul. 26, 2021 by the China National Intellectual Property Administration in corresponding Chinese Patent Application No. 201680078462.2, and an English Translation of the Office Action. (15 pages).
U.S. Appl. No. 17/942,709, Jens Kristian Lyngsøe, filed Sep. 12, 2022.
Belardi et al., "Hollow Antiresonant Fibers with Low Bending Loss", Optics Express, vol. 22, No. 8, 2014, 6 pages.
Notice of Allowance dated Jun. 14, 2022, issued in the corresponding Japanese Patent Application No. 2018-532357, with English Translation, 8 pages.
Notification of Reasons for Rejection dated Apr. 19, 2022, issued in the corresponding Japanese Patent Application No. 2018-532462, with English Translation, 11 pages.
Office Action (Decision of Rejection) issued on Aug. 10, 2021, by the Japanese Patent Office in corresponding Japanese Patent Application No. 2018-523498, with English Translation (9 pages).
Office Action (Communication pursuant to Article 94(3) EPC) issued on Feb. 2, 2023, by the European Patent Office in corresponding European Application No. 16 863 710.6-1105, (4 pages).
Office Action (The Second Office Action) issued on Jul. 26, 2021, by the China National Intellectual Property Administration in corresponding Chinese Patent Application No. 201680078462.2, and an English Translation of the Office Action. (33 pages).
Office Action issued on Nov. 4, 2022, by the Canadian Intellectual Property Office in Canadian Patent Application No. 3,004,945 (3 pages).
Advisory Action received for U.S. Appl. No. 16/096,878, mailed on Jan. 28, 2022, 3 pages.
Extended European Search Report issued on May 6, 2022, by the European Patent Office in European Patent Application No. 22153290.6. (9 pages).
Final Office Action received for U.S. Appl. No. 16/096,878, mailed on Nov. 1, 2022, 21 pages.
Final Office Action received for U.S. Appl. No. 16/096,878, mailed on Oct. 18, 2021, 16 pages.
First Office Action and Search Report issued on Jul. 28, 2023 by CNIP application No. 2022109660637.
International Search Report and Written Opinion received for PCT Patent Application No. PCT/DK2016/050364, mailed on Feb. 10, 2017, 20 pages.
International Search Report and Written Opinion received for PCT Patent Application No. PCT/DK2016/050459, mailed on Feb. 28, 2017, 20 pages.
Monro, Microstructured Optical Fibers, Guided Wave Optical Components and Devices, Chapter 3, 41-70, 2006.
Non-Final Office Action received for U.S. Appl. No. 16/096,878, mailed on Feb. 4, 2021, 18 pages.
Non-Final Office Action received for U.S. Appl. No. 16/096,878, mailed on Jul. 19, 2022, 22 pages.
Non-Final Office Action received for U.S. Appl. No. 16/096,878, mailed on Mar. 21, 2023, 21 pages.
Non-Final Office Action received for U.S. Appl. No. 17/744,401, mailed on Apr. 13, 2023, 6 pages.
Notice of Allowance received for U.S. Appl. No. 17/744,401, mailed on Jul. 28, 2023, 7 pages.
Office Action (Communication pursuant to Article 94(3) EPC) dated Aug. 12, 2020, by the European Patent Office in corresponding European Application No. 16 877 821.5-1001, 6 pages.
Office Action (Communication pursuant to Article 94(3) EPC) dated Aug. 4, 2021 by the European Patent Office in corresponding European Application No. 16 877 822.3-1001. (6 pages).
Office Action (Communication pursuant to Article 94(3) EPC) dated Jun. 16, 2023, by the European Patent Office in corresponding European Application No. 17788848.4 6 pages.
Office Action (Decision of Rejection) dated Jul. 22, 2023, by the State Intellectual Property Office in corresponding Chinese Patent Application No. 202110941422.9, and an English Translation of the Office Action.
Office Action (Decision of Rejection) dated Jul. 22, 2023, by the State Intellectual Property Office in corresponding Chinese Patent Application No. 202110941824.9, and an English Translation of the Office Action.
Office Action (Decision of Rejection) issued on Nov. 2, 2021, by the Japanese Patent Office in corresponding Japanese Patent Application No. 2018-532462, and an English Translation of the Office Action. (11 pages).
Office Action (Examination Report) dated Jul. 16, 2020, by the Intellectual Property Office of Singapore in corresponding Singapore Application No. 11201804707Y, 3 pages.
Office Action (First Office Action) issued on Jan. 5, 2023, by the State Intellectual Property Office in corresponding Chinese Patent Application No. 202110941422.9, and an English Translation of the Office Action. (23 pages).
Office Action (First office Action) issued on Jan. 5, 2023, by the State Intellectual Property Office in corresponding Chinese Patent Application No. 202110941824.9 and an English Translation of the Office Action. (22 pages).
Office Action (Notice of Reasons for Refusal) dated Mar. 1, 2022, by the Japanese Patent Office in corresponding Japanese Patent Application No. 2018-532357, and an English Translation of the Office Action. (6 pages).
Office Action (Notice of Reasons for Refusal) dated Oct. 28, 2021, by the Japanese Patent Office in corresponding Japanese Patent Application No. 2018-532357, and an English Translation of the Office Action. (12 pages).
Office Action (Notice of Second Review Opinion) issued on Oct. 8, 2021, by the State Intellectual Property Office in Corresponding Chinese Patent Application No. 201780039576.0, and an English Translation of the Office Action. (10 pages).
Office Action (Notification of Reasons for Rejection) issued on Apr. 4, 2023, by the Japanese Patent Office in corresponding Japanese Patent Application No. 2022-030754, and an English Translation of the Office Action. (12 pages).
Office Action (Second Office Action) issued on Sep. 5, 2023, by the Japanese Patent Office in corresponding Japanese Patent Application No. 2022-030754.
Office Action (The First Office Action) issued on Apr. 12, 2021, by the State Intellectual Property Office of the People's Republic of China in corresponding Chinese Patent Application No. 201780039576.0, and an English Translation of the Office Action. (20 pages).
Office Action dated Dec. 1, 2020, by the Japanese Patent Office in corresponding Japanese Application No. 2018-532357, with English Translation. (15 pages).
Office Action dated Oct. 28, 2020, by the Sate Intellectual Property Office of the People's Republic of China (National Chizawa Bureau) in corresponding Chinese Patent Application No. 201680075508.5 and an English translation of the Office Action. (6 pages).
Office Action issued on Dec. 19, 2022, by the Canadian Intellectual Property Office in Canadian Patent Application No. 3,008,053 (6 pages).
Office Action issued on Jan. 11, 2023, by the Canadian Intellectual Property Office in Canadian Patent Application No. 3,008,919, (5 pages).
Office Action issued on Nov. 19, 2020, by the Japanese Patent Office in corresponding Japanese Patent Application No. 2018-532357, and an English Translation of the Office Action. (15 pages).
U.S. Appl. No. 16/096,878 Examiner Interview Oct. 12, 2023.
U.S. Appl. No. 16/096,878 Final Rej Oct. 12, 2023.
U.S. Appl. No. 17/744,401 NOAR Oct. 16, 2023.
Applicant: NKT Photonics A/S, Notice of Preliminary Rejection for Korean Application 10-2018-7020721 mailed Sep. 18, 2023, entitled Photonic Crystal Fiber Assembly, 8 pages.
JP-2009007201-A Google Machine Translation Performed Oct. 6, 2023. (Year: 2023).

(56) References Cited

OTHER PUBLICATIONS

Notification of Reasons for Rejection (2nd OA), Application No. 2022-030754, Mailing date Sep. 5, 2023, 8 pages with English Translation.
Notice of Allowance received for U.S. Appl. No. 18/301,648, mailed on Nov. 22, 2023, 9 pages.
Non-Final Office Action received for U.S. Appl. No. 16/096,878, mailed on Feb. 13, 2024, 21 pages.
Notice of Allowance and Fee(s) Due for U.S. Appl. No. 18/301,648, Date Mailed Mar. 18, 2024, 12 pages.
Office Action (Non-Final) in U.S. Appl. No. 15/774,780, mailed Jan. 17, 2020.
Non-Final Office Action received for U.S. Appl. No. 18/493,548, mailed on May 2, 2024, 6 pages.
Final Rejection Mailed on May 30, 2024 for U.S. Appl. No. 16/096,878, entitled "A Method of Fiber Production," 18 page(s).

* cited by examiner

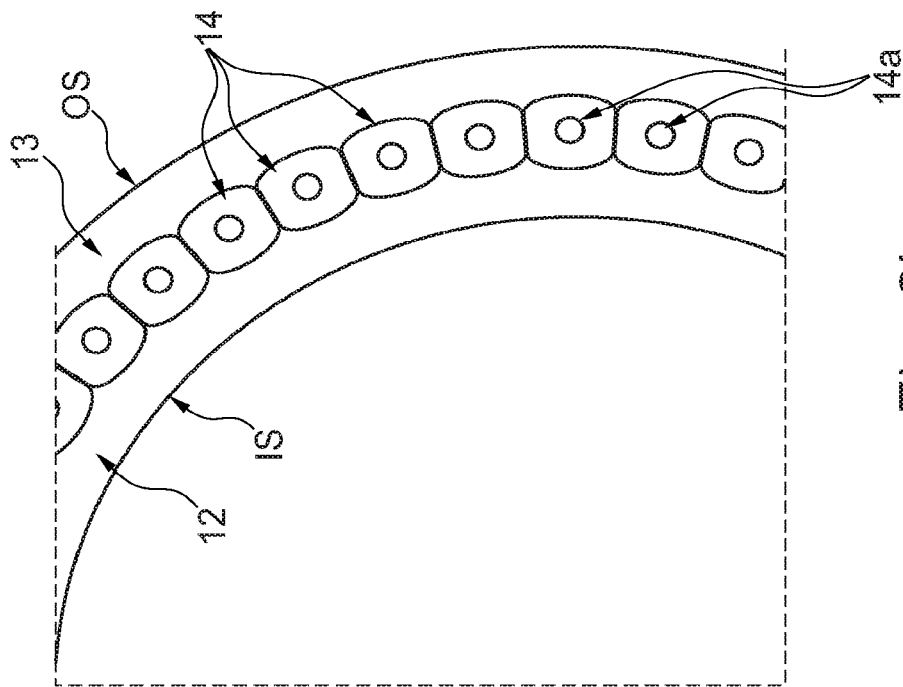
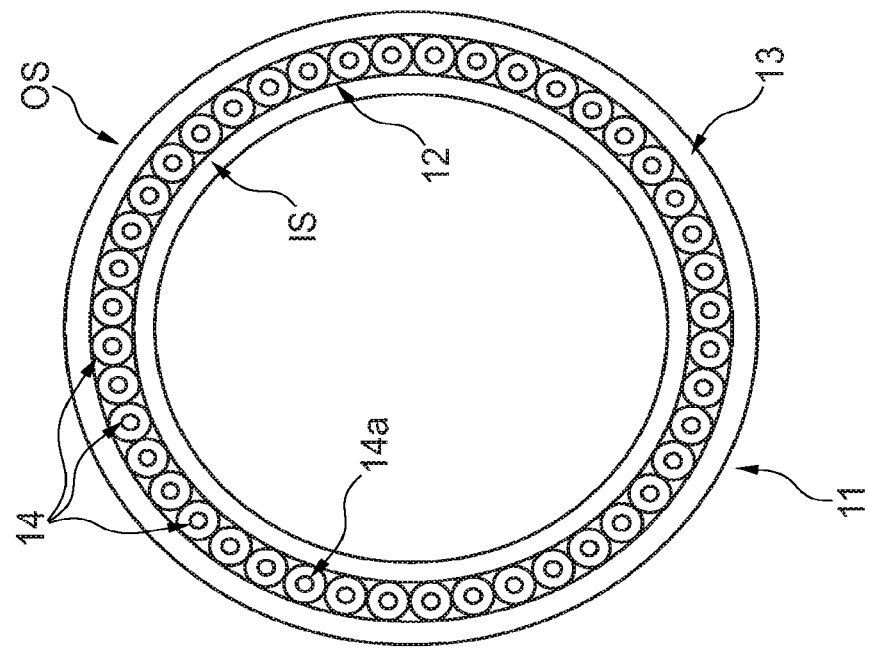
Fig. 2b
Fig. 2a

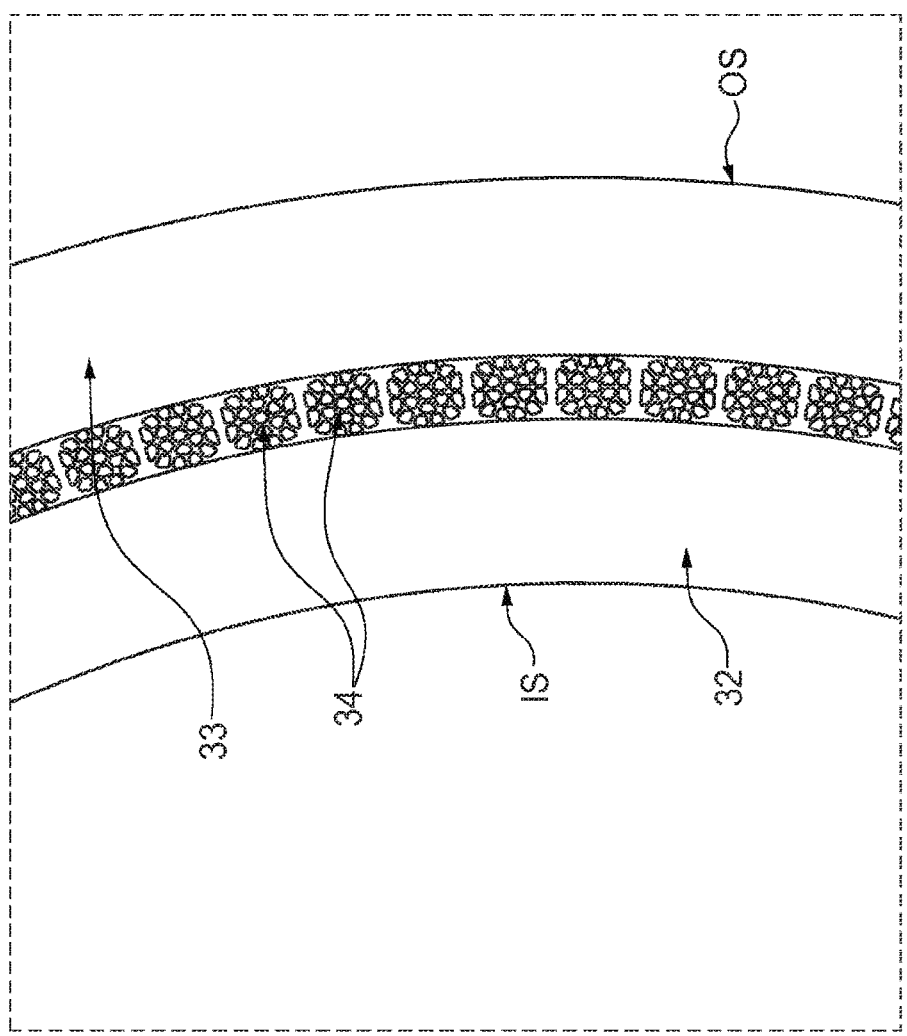

the preform into the fiber whilst controlling the gas pressure in the hole(s) connected to the pressure-controller. Thereby during drawing of the fiber, the size of individual holes can be controlled by individually addressing each hole in the preform and changing the pressure in that hole. If several holes are addressed simultaneously, then the structure which emerges in the actual fiber can be altered during the drawing process. The connector may comprise a plurality of chambers, each chamber being connectable to an external pressure source and the connector and preform may be arranged so that at least a first one of the longitudinal holes terminate in a first one of the chambers and at least a second one of the longitudinal holes terminate in a second one of the chambers; wherein the preform is arranged to pass through one or more of the chambers such that at least one of the longitudinal holes terminate in a chamber arranged next to a chamber through which the preform passes.

ELEMENT FOR A PREFORM, A FIBER PRODUCTION METHOD AND AN OPTICAL FIBER DRAWN FROM THE PREFORM

CROSS REFERENCE TO RELATED APPLICATIONS

The present application is a continuation of U.S. application Ser. No. 15/774,780, filed on May 9, 2018, which is a U.S. national stage of International Application No. PCT/DK2016/050364, filed on Nov. 10, 2016, which claims the benefit of Danish Application No. PA 2015 70724, filed on Nov. 10, 2015. The entire contents of each of U.S. application Ser. No. 15/774,780, International Application No. PCT/DK2016/050364, and Danish Application No. PA 2015 70724 are hereby incorporated herein by reference in their entirety.

TECHNICAL FIELD

The invention relates to a microstructured optical fiber comprising one or more holes extending along at least a length section of the fiber and in particular to the production thereof. The invention comprises a preform element for the optical fiber and a method of producing the preform element.

BACKGROUND ART

Microstructured optical fibers comprising one or more holes extending along at least a length section thereof are well known in the art and comprise in particular photonic crystal fibers, in the following referred to as PCF. The microstructured optical fibers are fibers having a core surrounded by a cladding region having a plurality of inclusions (sometimes called cladding features or microstructures) arranged in a background material, typically in a regular array. The inclusion may be gas, liquid, or solid inclusion. In principle the inclusions could be void, but in practice the voids will normally comprise some gas molecules.

The microstructured fiber may for example be of silica glass. Other materials may be added to the silica glass in order to alter the refractive index thereof or to provide effects, such as amplification of light, sensitivity, etc.

Microstructured optical fibers are usually produced by first producing a preform having a desired cross sectional structure and thereafter drawing the fiber from the preform at a suitable temperature ensuring that the material of the preform is sufficiently soft while not fully melted. Such a method is for example described in U.S. Pat. No. 6,954,574. The preform is produced by stacking a number of canes, each having a longitudinal axis, a first end and a second end, at least some of the canes being capillaries each having a hole parallel to the longitudinal axis of the cane and running from the first end of the cane to the second end of the cane. The canes are formed into a stack, where the canes being arranged with their longitudinal axes substantially parallel to each other and to the longitudinal axis of the stack provide the preform. Thereafter the preform is drawn into a fiber whilst maintaining the hole of at least one capillary in communication with a source of fluid at a first pressure whilst maintaining the pressure around the capillary at a second pressure that is different from the first pressure, thereby the hole at the first pressure becomes, during the drawing process, a size different from that which it would have become without the pressure difference.

U.S. Pat. No. 8,215,129 discloses a method of manufacturing a microstructured fiber, comprises: providing a preform comprising a plurality of longitudinal holes; mating at least one, but not all, of the holes with a connector to connect the hole(s) to an external pressure-controller; drawing the preform into the fiber whilst controlling the gas pressure in the hole(s) connected to the pressure-controller. Thereby during drawing of the fiber, the size of individual holes can be controlled by individually addressing each hole in the preform and changing the pressure in that hole. If several holes are addressed simultaneously, then the structure which emerges in the actual fiber can be altered during the drawing process. The connector may comprise a plurality of chambers, each chamber being connectable to an external pressure source and the connector and preform may be arranged so that at least a first one of the longitudinal holes terminate in a first one of the chambers and at least a second one of the longitudinal holes terminate in a second one of the chambers; wherein the preform is arranged to pass through one or more of the chambers such that at least one of the longitudinal holes terminate in a chamber arranged next to a chamber through which the preform passes.

U.S. Pat. No. 7,793,521 discloses a method of fabricating a photonic crystal or photonic band gap optical fiber comprises providing a complete preform that includes a plurality of holes in an outer diameter, wherein the holes extend from a first end of a preform to a second end of the preform, and forming at least one radially inwardly-extending slot within the preform such that the slot intersects at least some of the holes, wherein the slot does not intersect at least one hole. The method also includes establishing a first pressure in the holes intersected by the slot by introducing the first pressure to the slot, and establishing a second pressure in the at least one hole not intersected by the slot by introducing the second pressure to an end of the at least one hole not intersected by the slot. The method further includes drawing the preform into a fiber while independently controlling the first and second pressures.

WO 03/078338 discloses a method of making a preform for a microstructured optical fiber using a sol-gel process. The described preform may comprise concentric tubes and a plurality of tubes and/or rods placed between the concentric tubes.

DESCRIPTION OF THE INVENTION

In an embodiment it is an object to provide a preform element for a microstructured optical fiber preform which makes the production of the preform relatively simple compared to prior art methods.

In an embodiment it is an object to provide a preform element for a microstructured optical fiber preform which makes the production of the preform economically beneficial compared to prior art methods.

In an embodiment it is an object to provide a preform element for a microstructured optical fiber comprising a plurality of holes extending along the length of the fiber.

In an embodiment it is an object to provide a method of producing a microstructured optical fiber which is relatively simple and offers large freedom in design of the fiber and where the diameter of longitudinal holes can be controlled with a high accuracy.

These and other objects have been solved by the invention or embodiments thereof as defined in the claims and as described herein below.

It has been found that the invention or embodiments thereof have a number of additional advantages which will be clear to the skilled person from the following description.

The phrase "radial distance" means distance determined in radial direction perpendicular to the center axis. The phrase "radial direction" is a direction from the center axis and radially outwards or a direction radially inwards towards the center axis. The term "substantially" should herein be taken to mean that ordinary product variances and tolerances are comprised.

The terms "microstructured fibers" and "microstructured optical fibers" are used interchangeably and in this context are meant to cover fibers comprising microstructures such as photonic crystal fibers, photonic band gap fibers, leaky channel fibers, holey fibers, etc. The microstructured optical fiber comprises a core region and a cladding region surrounding the core where the cladding region may have several layers and/or cladding sub regions with different refractive index, such sub regions will usually be referred to as inner cladding region, outer cladding region and optionally further regions, where inner and outer are determined in radial direction from the center axis of the optical fiber or the preform or preform element. Where the terms core region and cladding region are used about a preform or a preform element, the terms refers to the region the after the preform assembly comprising the preform element has been drawn to a fiber. Unless otherwise noted, the refractive index refers to the average refractive index which is usually calculated separately for the core region and each cladding layer surrounding it and/or optionally for each cladding sub region. A cladding layer is defined as a layer with a thickness which layer surrounds the core region where the refractive index is substantially homogeneous or where the layer has a base material with a substantially homogeneous refractive index and a plurality of microstructures arranged in a uniform pattern.

The term "about" is generally used to include what is within measurement uncertainties. The term "about" when used in ranges, should herein be taken to mean that what is within measurement uncertainties are included in the range.

The term "longitudinal hole" means that the hole generally extending along the length of the preform ring element, such as along the hole length or along a section of the length. The term "hole" means "longitudinal hole" unless anything else is specified.

It should be emphasized that the term "comprises/comprising" when used herein is to be interpreted as an open term, i.e. it should be taken to specify the presence of specifically stated feature(s), such as element(s), unit(s), integer(s), step(s) component(s) and combination(s) thereof, but does not preclude the presence or addition of one or more other stated features.

Throughout the description or claims, the singular encompasses the plural unless otherwise specified or required by the context.

According to the invention it has been found to be highly advantageous to use a preform element according to the invention in the production of a preform and a fiber drawn therefrom. The preform element may thus be used as a building block together with any additional preform element. Thereby a very flexible and cost effective production method of microstructured optical fibers and preforms therefore has been provided.

In particular it has been found that by producing the preform element according to an embodiment of the invention separately from the one or more additional preform elements is very cost effective, because if the preform element according to an embodiment of the invention is damaged during the step comprising providing the intersecting slot, the additional preform element(s) will not be damaged and may thus still be used.

The term "additional preform element" is used to mean an additional preform element relative to the preform element according to an embodiment of the invention, where the additional preform element may or may not be a preform element according to an embodiment of the invention.

The term "preform element" generally means a preform element according to an embodiment of the invention.

Further it has been found that the preform element ensure a desired method of controlling the pressure within the longitudinal hole(s) of the preform element in that the pressure control may be provided in a very beneficial way and with a high accuracy via the slot which intersects one or more of the longitudinal holes. Further due to the preform element this slot may be provided prior to assembling the preform element with additional preform elements of the preform. This may be much simpler since the preform element may be simpler to handle during the performing of the intersecting slot than a final preform assembly and further the risk of damaging the preform assembly may be reduced.

The preform element has a length and a center axis along its length, a first and second end defined by its length and an outer preform element surface. The preform element comprising a plurality of longitudinal structures disposed to form longitudinal hole(s) in a background material. The preform element comprises at least one slot extending from its outer preform element surface and intersecting at least one of the longitudinal holes and wherein the at least one slot does not fully intersect the preform element.

The intersecting slot is adapted for providing pressure control within the intersected holes during drawing of the preform assembly to a fiber. The preform element does not constitute a final preform but needs to be assembled with at least one additional preform element to form a preform assembly for which the optical fiber may be drawn.

As it will be explained further below the preform element may advantageously be a preform center element or a preform ring element, however it is not excluded that the preform element could form other parts of a preform assembly, such as a half preform ring element and etc.

As explained in the background art, it is well known to control the pressure of holes during drawing of a preform to a microstructured optical fiber. For example the method disclosed in U.S. Pat. No. 7,793,521 describes an advantageous way of controlling the hole pressure during drawing. However, this method requires providing a radially inwardly extending slot in the final preform to intersect the holes that are to be pressure controlled. Due to the high fragility of a final preform, it may frequently happen that the preform is damaged during attempt to make such slot e.g. by cutting to deep or by fully breaking the preform. In such case—in the method of U.S. Pat. No. 7,793,521—the whole preform must be discarded.

In the present invention a slot e.g. a radially inwardly extending slot can simply be made in the preform element before or after pre-drawing. At that stage the preform element is much simpler to handle and any risk of cutting too deep may be reduced. Further, even if the preform element is damaged during cutting of the slot only this preform element or only a section of it which may be cut off will be discarded and not the whole preform. The preform element may be produced to be shelved for later use and due to the invention is very advantageous to have a stock of preform elements ready for use in the production of final preform assemblies. Thereby if a preform element is damaged during slot cutting it can simply be replaced with a fresh preform element and thereby any delay may be reduced or completely avoided.

Preferably the plurality of longitudinal structures are encaged in and/or forms part of the background material and extending in the length direction of the preform element, wherein one or more of the plurality of longitudinal structures form(s) the longitudinal hole(s). The background material may for example be provided fully or partly by solid longitudinal structures and/or by material of hollow longitudinal structures, such as hollow tubes, e.g. capillary tubes.

The term "encaged in" is used to mean that the longitudinal structures is mechanically locked or hold in position by elements, such as the canes described below forming background material.

In an embodiment one or more of the plurality of longitudinal structures are hollow tubes with the longitudinal holes and/or the longitudinal holes are longitudinal interspace holes formed between the longitudinal structures, wherein the least one slot extending from its outer preform element surface intersects at least one of the holes of the hollow tubes and/or at least one of the interspace holes.

The longitudinal structures and further parts of the preform element if any may in principle be of any material from which an optical fiber can be drawn. Suitable materials include any kind of glass, such as silica glass, soft glass chalcogenide glass or any combinations thereof.

The longitudinal structure may in principle be any kind of longitudinal structure which can be applied in optical fibers. The longitudinal structure may in principle extend in any lengths of the preform element. Advantageously the preform ring element extends in substantially the whole length of the preform element.

The longitudinal holes may be provided by using one or more hollow tubes and/or by arranging the longitudinal structures to form longitudinal interspace holes between adjacent longitudinal structures.

In an embodiment the longitudinal structures comprises one or more solid structures, such as rods.

In an embodiment the longitudinal structures comprises one or more hollow tubes, such a capillary tubes. Advantageously the hollow tubes are of glass, such as silica glass, soft glass chalcogenide glass or any combinations thereof, optionally the hollow tube glass comprises one or more dopants, such as one or more, index-changing dopants, such as Ge, B, F, P, Al and/or one or more active material dopants, such as the rare-earth elements Er or Yb.

Advantageously the background material is glass, such as silica glass, soft glass chalcogenide glass or any combinations thereof, optionally the background material comprises one or more dopants, such as one or more, index-changing dopants, such as Ge, B, F, P, Al and/or one or more active material dopants, such as the rare-earth elements Er or Yb.

Generally it is desired that the preform element comprises a plurality of longitudinal structures distributed in the preform element to provide a desired optical function in the final microstructured optical fiber e.g. to provide a desired effective refractive index in a part of the cladding such as a layer and/or a cladding sub region of the microstructured optical fiber.

The longitudinal structures are preferably arranged to be substantially parallel to the center axis and preferably extend in substantially the whole length of the preform element. In an embodiment the longitudinal structures are arranged to helically surround the center axis. Such preform ring element is advantageous in the production of chirally-coupled-core (CCC) fibers.

In an embodiment the hollow tubes each comprise a plurality of longitudinal holes substantially parallel to the center axis of the preform element, the plurality of holes of each hollow tube are preferably arranged in a predetermined cross sectional pattern comprising at least one ring of holes and optionally a center hole.

In an embodiment each hollow tube comprises one single longitudinal hole, for example the hollow tube is in the form of a capillary tube.

In an embodiment the hollow tubes each comprise several longitudinal holes for example a plurality of substantially parallel holes extending in length direction of the hollow tube. By applying hollow tubes with two or more holes it may be simpler to provide a microstructured optical fiber from a preform comprising the preform element as it will be described further below. In an embodiment the hollow tube has 3 or more holes. In an embodiment the hollow tube has 6 or more holes, such as at least 9 holes. The holes of the hollow tube are advantageously arranged in a predetermined cross sectional pattern comprising at least one ring of holes and optionally a center hole.

The phrase "ring of holes" should herein be interpreted to mean a cross sectional ring shaped pattern of holes with intermediate material bridges between holes separating adjacent holes from each other. In other words, a "ring of holes" is—when seen in a cross-sectional cut—composed of alternating holes and bridges. Each bridge has a minimum width determined as the shortest distance between two adjacent holes of a ring of holes.

A hollow tube with two or more holes is also referred to as a multi-hollow tube.

In an embodiment the longitudinal structures comprises at least one ring of longitudinal structures.

The phrase "ring of longitudinal structures" should be interpreted to mean longitudinal structures in the form of solid structures, hollow tubes or a combination thereof arranged in a side by side configuration to form a ring.

In an embodiment the preform element has n fold rotational symmetry with respect to rotations about its center axis, wherein n is up to 500, such as up to 100, such as up to 50, such as from 2 to 20.

Advantageously the longitudinal structures extend in substantially the entire length of the preform element.

Advantageously, the preform element is at least partly fused prior to performing the slot. Thereby the In an embodiment at least one, such as at least all of the plurality of longitudinal structures are hollow tubes and/or the preform element comprises one or more interspace holes, wherein the preform element comprises at least one slot extending from its outer preform element surface and intersecting at least one of the holes of the hollow tubes and/or at least one of the interspace holes such that the at least one slot does not fully intersect the preform element. Preferably the at least one slot is an annular slot intersecting a plurality, such as half or substantially all of the holes of the hollow tubes and/or interspace hole.

In practice the slot may be as described in U.S. Pat. No. 7,793,521 with the difference that the slot is performed in the preform element.

In an embodiment the at least one slot is in the form of a radially inward cut in the preform element from its outer preform element surface. The slot may be substantially perpendicular to the center axis or it may have an angle to the cross sectional plan perpendicular to the center axis e.g. in the form of an oblique annular cut e.g. with an angle up to about 45 degrees, such as up to about 25 degrees, such as up to about 15 degrees. In practice it is simpler to prepare the slot to be substantially perpendicular to the center axis.

Advantageously the at least one slot is an annular slot intersecting a plurality of the holes of the hollow tubes and/or all of the interspace holes, preferably, such as substantially all of the holes of the hollow tubes and/or all of the interspace holes of the preform cladding region or the outer preform cladding region are intersected by said annular slot.

The preform element may comprise several slots e.g. one or more arch shaped slot which together intersects the desired holes to be intersected. In an embodiment the preform element comprises a plurality of arc shaped slots each having an arc shape relative to the outer preform element surface of at least about 50 degrees such as from 80 degrees to about 350 degrees, such as from about 150 degrees to about 180 degrees. The plurality of slots may for example be axially displaced along the preform element center axis.

By providing the preform element with several axially displaced slots, the slots may be provided to intersect relatively many holes while simultaneously ensure a high mechanically stability of the preform element.

In an embodiment the preform element comprises two or more arc shaped slots which are arranged with a rotational displacement relative to each other.

In an embodiment the preform element comprises two or more arc shaped slots arranged with a relative configuration as described 7,793,521.

The slot may in practice be positioned at any position preferably not too far from the first end of the preform element. The first end of the preform element is thus the end at which the pressure control is adapted to be provided and the second end of the preform element is the end at which the microstructured optical fiber is adapted to be drawn.

In an embodiment the at least one slot is positioned at a distance from the first end of the preform element which is up to 1/10 of the length of the preform element, the distance is preferably at least about 0.5 mm or longer, such as at least about 5 mm or longer, such as about 1 cm or more. As mentioned, it is desired that the slot is not too far from the first end because the part of the preform element that can be drawn to microstructured optical fiber is at most from the second end to the slot and naturally it is not desired to waste unnecessarily lengths of preform element.

Advantageously the distance from the outer preform element surface to an radially outermost of said at least one intersected hole is less than about 1/8 of the preform element diameter, such as less than about 1/10 of the preform diameter, such as less than 1 cm, such as less than about 0.5 cm, such as less than about 3 mm. By keeping the distance from the outer surface to the intersected hole(s) as short as possibly, the risk of damaging the preform element during the performing of the slot may be highly reduced. This embodiment is particular useful where the preform element is adapted to be assembled with an additional preform element in the form of an overcladding tube. The overcladding tube provides the preform assembly as well as the final optical fiber with mechanical strength and for many optical fibers such an overcladding tube is required to ensure low leakage of light and further the overcladding tube may be made of less expensive glass material with a lower purity than the core region material and preferably also than the cladding material immediately surrounding the core region. The overcladding tube may e.g. be of silica or flour doped silica.

In an embodiment the intersected holes (originating from the hollow tubes or interspace holes) are closed at a position from the slot to the first end, such as at the first end of the preform and/or at the intersection towards the first end and/or a position there between.

In an embodiment the intersected holes are closed at an additional slot performed for closing such holes. The intersected holes may be closed by using a closing material, such as epoxy or similar sealing material and or the intersected holed may be closed by applying heat to collapse the holes.

As mentioned above the preform element may advantageously be a preform center element. The preform center element is adapted for be assembled with at least one additional preform element surrounding the preform center element. The at least one additional preform element may be an additional preform ring element such as a preform ring element according to an embodiment of the invention.

The preform center element comprises at least a preform core region and a preform cladding region surrounding the preform core region, wherein the plurality of longitudinal structures forming the longitudinal holes are disposed in the preform cladding region. The holes may in principle be arranged with cross-sectional configuration, preferably comprising a pattern of holes. Advantageously the holes are arranged in a cross-sectional hexagonal or octagonal pattern.

In an embodiment the preform cladding region comprises an inner preform cladding region surrounding the preform core region and an outer preform cladding region surrounding the inner preform cladding region, wherein the plurality of longitudinal structures forming the longitudinal holes are disposed in the outer preform cladding region. Thereby the longitudinal holes in the outer preform cladding region may be subjected to pressure control during drawing via the slot.

In an embodiment the plurality of longitudinal structures are disposed to form a ring of longitudinal holes in the preform cladding region. Such ring of longitudinal holes may for example be adapted for providing an air cladding in a fiber drawn from a preform comprising the preform element. By subjecting the ring of holes to pressure control via the slot a highly accurate pressure control may be obtained and the achieved air filling factor of the air cladding may be desirably high.

As mentioned above the preform element may advantageously be a preform ring element. The preform ring element is advantageously adapted for being assembled with at least one additional preform element comprising at least an additional preform center element and optionally one or more additional preform ring elements and optionally an overcladding tube.

In an embodiment the preform ring element of an embodiment of the invention comprises a ring shaped wall with a length and a center axis along its length. The preform ring element has an outer preform element surface, an inner preform element surface and a first and second end defined by its length. The preform ring element comprises a ring wall background material and a plurality of longitudinal structures encaged in the ring wall background material and extending in the length direction of the preform.

One or more of the plurality of longitudinal structures form longitudinal holes in the preform ring element. The preform ring element comprises at least one slot extending from its outer preform element surface and intersecting at least one of the longitudinal holes such that the at least one slot does not fully intersect the ring wall. The phrases "length of the ring shaped wall" and "the length of the preform ring element" are used interchangeably.

The preform ring element may be adapted to be assembled with a preform center element which comprises the core part of the final fiber preform for being drawn to a microstructured optical fiber.

By producing the (additional) preform center element and the (additional) preform ring element of an embodiment of the invention separately a much simpler production can be obtained and the preform element may be produced in relatively long lengths and be cut into desired lengths and stored for later use with selected preform center elements.

The preform ring element may advantageously be provided by arranging an inner hollow cane inside an outer hollow cane and arranging the longitudinal structures between the inner and outer cane.

The ring wall background material may have any refractive index and be doped or non-doped.

In an embodiment the ring wall background material comprises a ring wall inner background material e.g. provided by the inner cane and a ring wall outer background material e.g. provided by the outer cane, which inner and outer background material may be equal or may differ from each other. The inner and outer background material may for example differ from each other with respect to refractive index, index-changing dopants, such as Ge, B, F, P, Al and/or active material dopant, such as the rare-earth elements Er or Yb.

In an embodiment the inner and outer background material is substantially free of active material dopant.

In an embodiment the inner ring wall inner background material is silica doped with fluorine and the outer background material is non doped silica.

The elements—i.e. the element(s) forming the ring wall background material and the longitudinal structures—of the preform ring element may in principle be of any material from which an optical fiber can be drawn. Suitable materials include any kind of glass, such as silica glass, soft glass chalcogenide glass or any combinations thereof.

The longitudinal structure encaged in the ring wall background material may in principle be any kind of longitudinal structure which can be applied in optical fibers. The longitudinal structure may in principle extend in any lengths of the preform ring element. Advantageously the preform ring element extends in substantially the whole length of the preform ring element.

Generally it is desired that the preform ring element comprises a plurality of longitudinal structures distributed in the ring shaped wall of the preform ring element to provide a desired optical function in the final microstructured optical fiber e.g. to provide a desired effective refractive index in a part of the cladding such as a layer and/or a cladding sub region of the microstructured optical fiber.

In an embodiment where the longitudinal structures are arranged in a ring of longitudinal structures, the ring of longitudinal structures comprises a ring of contacting longitudinal structures where the longitudinal structures are arranged in a configuration in contact with adjacent longitudinal structures along their lengths. The ring of longitudinal structures is alternatively a ring of non-contacting longitudinal structures where the longitudinal structures are arranged in a configuration where they are not in contact with adjacent longitudinal structures along their lengths thereby forming interspace holes.

The term "interspace hole" is herein used to designate a longitudinal hole provided between adjacent longitudinal structures.

Distance arrangements are advantageously arranged at two or more positions along the length of the preform element for controlling the distance of the longitudinal structures. In an embodiment at least one distance arrangement is arranged at each end of the preform element, e.g. in the form of blind elements arranged between the longitudinal structures to provide the desired distance between the longitudinal structures to form the interspace holes extending in the longitudinal length direction of the preform element, preferably in the whole length of the preform element except for the blinds. The blinds may e.g. be sections of silica rods. In principle the blinds may have any length, but advantageously the blinds are selected to be relatively short in order not to waste unnecessary material. At the same time the blinds should advantageously be sufficiently long to ensure high stability of the preform ring element. The length of the blinds are for example for example up to 50% of the perform length. In practice the blinds may be as short as possible while still being sufficiently large to position as distance elements.

In an embodiment the longitudinal structures encaged in the ring wall background material comprise a solid structure. The solid structure is advantageously a solid structure having a refractive index different from an index of the ring wall background material. The solid structure may be of the same or of a different material than the ring wall background material, such as silica and it may e.g. be doped to have a different refractive index. In an embodiment the preform ring element comprises a ring of solid longitudinal structures, wherein at least some of the solid longitudinal structures have a refractive index different from the refractive index of the ring wall background material.

The ring of solid structures comprises in an embodiment a ring of non-contacting solid structures where the solid structures are arranged in a configuration where they are not in contact with adjacent solid structures along their lengths thereby forming the interspace holes as described above. A distance arrangement may advantageously be arranged at two or more positions along the length of the preform ring element for controlling the distance between the adjacent solid structures and thereby defining the size of the longitudinal interspace holes.

In an embodiment where the preform ring element comprises a ring wall inner background material and a ring wall outer background material with different refractive index, preferably at least some of the solid longitudinal structures have a refractive index different from at least one of the ring wall inner background material and the ring wall outer background material. The ring wall inner background material and the ring wall outer background material may advantageously be provided by an inner hollow cane and an outer hollow cane as described further below.

In an embodiment the longitudinal structures encaged in the ring wall background material comprises at least one hollow tube comprising a hole extending along the length of the hollow tube and preferably along the length of the preform ring element i.e. a longitudinal hole. The hollow tube(s) is/are preferably substantially parallel to the center axis of the preform ring element.

Preferably the preform element, such as the preform center element or the preform ring element comprises a ring of hollow tubes.

The one or more holes of the hollow tubes preferably extend substantially in the whole length of the hollow tube e.g. with the exception that the holes may be closed at one or both of its ends and/or at the slot as described further below.

The phrase "ring of hollow tubes" should be interpreted to mean hollow tubes arranged in side by side configuration e.g. corresponding to the ring shaped wall e.g. so that the ring of hollow tubes is concentrically with the ring shaped wall or alternatively in an hexagonal or octagonal configuration.

The ring of hollow tubes comprises in an embodiment a ring of contacting hollow tubes where the hollow tubes are arranged in a configuration in contact with adjacent hollow tubes along their lengths. The ring of hollow tubes is alternatively a ring of non-contacting hollow tubes where the hollow tubes are arranged in a configuration where they are not in contact with adjacent hollow tubes along their lengths thereby forming longitudinal interspace holes. A distance arrangement e.g. as described above may advantageously be arranged at two or more positions along the length of the preform ring element for controlling the distance of the hollow tubes and thereby defining the size of the longitudinal interspace holes.

Generally the longitudinal holes may have equal or different cross-sectional shape.

In the embodiment where the preform element comprises holes originating from the holes of the hollow tubes as well as interspace holes, the hollow tube holes and the interspace holes may be equal or different in size and cross-sectional shape. Thereby a large design freedom may be obtained.

In an embodiment the preform ring element comprises hollow tubes, such as multi hollow tubes and the hollow tubes may be of the same or a different material than the ring wall background material or materials e.g. as the materials discussed above.

The longitudinal structures may in principle have any cross-sectional periphery, such as round, square or with any number of angles. Where the preform element is fused and/or pre-drawn as described below, the longitudinal structures may be deformed to have a cross-sectional periphery which is approximately square or rectangular where the preform element is a preform ring element and approximately square hexagonal or octagonal where the preform element is a preform center element.

In an embodiment the longitudinal structures are arranged in a ring of longitudinal structures and the respective longitudinal structures are approximately rectangular with a large cross dimension and a short cross dimension and preferably the longitudinal structures are arranged with their respective large cross dimensions substantially in radial direction.

In an embodiment where the preform element is a preform ring element, the ring wall may have any thickness determined from the inner preform element surface to the outer preform element surface. In practice the thickness of the ring wall may be different or equal along the annular extension of the ring shape. Preferably the ring wall thickness is substantially uniform along its length, which makes it simpler to assemble the preform ring element with one or more additional preform elements to a final preform assembly and to draw a microstructured optical fiber from the preform assembly.

In an embodiment the ring wall has a substantially identical thickness along its annular extension at least in a cross section, preferably in its whole length, more preferably the preform ring element is substantially circular symmetrical in its center axis with respect to thickness.

The ring wall has an average inner diameter (ID) defined by the inner preform element surface and an average outer diameter (OD) defined by the outer preform element surface.

The average inner diameter (ID) and average outer diameter (OD) may have any size where OD>ID. In practice, average inner diameter (ID) should advantageously not be too small. If the average inner diameter (ID) of the preform ring element to be assembled with a preform center element has a too large average inner diameter (ID), the preform ring element may be pre-drawn to obtain the desired average inner diameter (ID).

In general it is desired that average inner diameter (ID) is at least about 1 mm, such as at least about 2 mm, such as at least about 3 mm, such as at least about 5 mm, such as at least about 8 mm.

The average inner diameter (ID) and the average outer diameter (OD) are advantageously substantially constant along the length of the preform ring element, preferably the thickness of the preform ring element is defined by 0.5 times OD minus ID is from about 0.3 mm to about 2 cm, such as from about 1 mm to about 1 cm, such as from about 3 mm to about 6 mm.

In practice, the relative size of ID and OD is preferably selected such that ID/OD in at least a cross section of the preform ring element is from about 0.3 to about 0.95, such as from about 0.7 to about 0.9.

In an embodiment the ring wall comprises an inner hollow cane, an outer hollow cane and a plurality of longitudinal structures encaged between the inner cane and the outer cane.

In an embodiment the longitudinal structures are encaged by being held in place in the ring shaped wall background material, such as between the inner hollow cane and the outer hollow cane. To ensure a safe handling of the preform ring element without any risk of the longitudinal structures slipping out of the encaging, the longitudinal structures may be held in position by holding arrangement positions at one or both ends of the preform ring element and/or the parts of the preform ring element e.g. the longitudinal structures and the ring shaped wall background material may be fused together. A holding arrangement may simultaneously serve to close optional holes and/or serve as a distance arrangement as described above.

The inner hollow cane and the outer hollow cane may have equal or different cane wall thickness and they may be of equal or different material and/or have equal or different refractive index.

In an embodiment the inner hollow cane has an inner cane wall thickness and the outer cane has an outer cane wall thickness, wherein the inner cane wall thickness and the outer cane wall thickness independently of each other are from about 1 mm to about 1 cm, such as from about 2 mm to about 5 mm.

The inner hollow cane has an inner cane average inner diameter (ICID) and an inner cane average outer diameter (ICOD) and the outer hollow cane has an outer cane average inner diameter (OCID) and an outer cane average outer diameter (OCOD)

The ICID/ICOD and the OCID/OCOD are preferably, independently of each other from about 0.3 to about 0.95, such as from about 0.7 to about 0.9.

As explained the preform element may be pre-drawn to a desired inner diameter before being assembled with additional preform element(s). Therefore, where the preform element is a preform ring element the relative size of the inner and outer diameters of the preform ring element as well as of the inner and outer cane is more important that the actual size and advantageously the preform ring element is initially produced with larger inner diameter than actually expected to be required for use in a final preform.

A preform element to be assembled with additional preform element(s) may in principle have any length which is handleable and generally it is desired that the preform element has a length of from about 50 cm to about 150 cm in its state for being assembled e.g. after pre-drawing. In an embodiment the preform element is initially produced to have a length up to about 1.5 m, such as up to about 1 m, such as up to about 0.5 m. Thereafter the preform element may be pre-drawn to have a larger length, where after or during the pre-drawing it is cut into several preform elements of shorter lengths and/or the initially produced preform element is cut into several preform elements of shorter lengths e.g. 50-150 cm each, after the respective shorter length preform elements may be pre-drawn prior to being assembled with additional preform elements for a final preform assembly.

In an embodiment the preform ring element has an inner diameter of at least about 5 mm, such as at least about 10 mm, such as from about 15 to about 5 cm or even 10 cm.

In an embodiment the ring wall of the preform ring element has full rotational symmetry with respect to thickness. In practice it is simpler to handle such preform ring elements since they are simpler to assemble with additional preform element(s).

Alternatively the ring wall of preform ring element may have n fold rotational symmetry in its center axis with respect to thickness, wherein n is up to 500, such as up to 100, such as up to 50, such as from 2 to 20. In practice it is desired that the ring wall of the preform ring element with n fold rotational symmetry in its center axis has at most 10 fold symmetry, such as 6 to 9 fold symmetry.

Advantageously the preform ring element comprises a plurality of longitudinal structures encaged in the ring wall background material, wherein the longitudinal structures are preferably extending in substantially the entire length of the preform ring element.

In an embodiment the longitudinal structures encaged in the ring wall background material are equal or different in material and/or shape and/or size.

Advantageously the preform ring element comprises one or more rings of longitudinal structures, where each ring of longitudinal structures has equal outer dimension, thereby making it relatively simple to assemble the preform ring element e.g. by encaging the ring of longitudinal structures between an inner and an outer hollow cane. The longitudinal structures of a ring of longitudinal structures may optionally differ from each other. In an embodiment the longitudinal structures of a ring of longitudinal structures comprise alternating solid structure and hollow tubes. In an embodiment the longitudinal structures of a ring of longitudinal structures comprises hollow tubes with alternating large and small hole diameters.

In an embodiment the plurality of longitudinal structures are arranged in a side by side configuration along the annular extension of the ring shaped wall to form at least one ring of longitudinal structures, such as two rings of longitudinal structures, such as three rings of longitudinal structures. The option of having more than one ring of longitudinal structures provides even more freedom for preparing final preform assemblies in a simple way and the preform ring element may thus be used to provide a large part of the cladding region, such as an inner cladding, an outer cladding or a part thereof or even all of the cladding of the final microstructured optical fiber drawn from a preform comprising the preform ring element.

In an embodiment where the preform ring element comprises two or more rings of longitudinal structures the two or more rings of longitudinal structures are advantageously rotationally offset, which makes it simpler to arrange the longitudinal structures between an outer and an inner hollow cane. For simple assembling the longitudinal structures may have an angular outer shape as described above, such as square or rectangular or with a single planar side.

In an embodiment the preform ring element comprises at most two rings of longitudinal structures.

The present invention is particularly beneficial where the preform element comprises at least one hollow tube and/or at least one interspace hole. Due to the preform element such holes of hollow tubes and such interspace holes can in a simple way be controlled during drawing of the final preform comprising such preform ring element to an optical fiber.

The preform element is advantageously obtained by the method described in the following.

The invention also comprises a method of producing a preform element e.g. as described above.

The method comprises providing a plurality of longitudinal structures and disposing the longitudinal structures to form longitudinal hole(s) in a background material the method comprises providing at least one slot extending from the outer preform element surface and intersecting at least one of the longitudinal holes and wherein the at least one slot does not fully intersect the preform element.

The longitudinal structures may be as described above and the longitudinal holes may be provided by hollow tubes or as interspace holes between longitudinal structures.

Advantageously the method comprises arranging the longitudinal structures to provide the plurality of longitudinal holes substantially parallel to the center axis of the preform element.

Preferably the method comprising providing the at least one slot is in the form of a radially inwards cut in the preform element from its outer preform element surface, wherein the radially inwards cut is substantially perpendicular to the center axis. The cut may e.g. be in the form of an oblique annular cut e.g. with an angle up to about 45 degrees, such as up to about 25 degrees, such as up to about 15 degrees. In practice it is simpler to prepare the slot to be substantially perpendicular to the center axis In an embodiment the method comprises providing several slots e.g. one or more arch shaped slot which together intersects the desired holes to be intersected.

In an embodiment the method comprises providing a plurality of slots by providing a plurality of arc shaped radially inwards cuts each having an arc shape relative to the outer preform element surface of at least about 50 degrees such as from 80 degrees to about 350 degrees, such as from about 150 degrees to about 180 degrees. The plurality of slots may for example be axially displaced along the preform element center axis.

To ensure high stability even where the cuts are to intersect relatively many holes the plurality of radially inwards cuts may advantageously be displaced along the axis of the preform element and preferably rotationally off set relative to each other.

Advantageously the at least one slot is provided at a distance from the first end of the preform element which is preferably up to $\frac{1}{10}$ of the length of the preform element, the distance is preferably at least about 0.5 mm or longer, at least about 5 mm or longer, such as about 1 cm to about 20 cm.

The method may further comprise closing the intersected holes at a position from the first end of the preform to the intersection, such as at the first end of the preform and/or at the intersection towards the first end of the preform and/or at an additional slot intersecting the holes, the intersected holes are preferably closed by collapsing and/or by filling a solid material into the holes as described above.

In an embodiment the method comprises stacking the longitudinal structures and optionally arranging the stacked longitudinal structures in an outer cane. The method of stacking longitudinal structures are well known in the art and will thus not be described further herein.

In an embodiment where the preform element is a preform center element the method comprises stacking the longitudinal structures to form at least the preform core region and the preform cladding region surrounding the preform core region, wherein the plurality of longitudinal structures forming the longitudinal holes are disposed in the preform cladding region. The longitudinal structures may in principle be stacked to dispose the holes with any cross sectional structures, however it is preferred that the holes are disposed in a cross-sectional hexagonal or octagonal pattern.

In an embodiment the method comprises arranging the longitudinal structures to form the preform cladding region such that is comprises an inner preform cladding region surrounding the preform core region and an outer preform cladding region surrounding the inner preform cladding region. Thereby the slot may be performed to intersect the holes of the outer cladding region.

In an embodiment the method comprises disposing the plurality of longitudinal structures to form a ring of longitudinal holes in the preform cladding region. The ring of longitudinal holes may be adapted for providing an air cladding in a fiber drawn from a preform comprising the preform element.

In an embodiment the method comprises performing the at least one slot in the form of an annular slot intersecting a plurality of the holes of the hollow tubes and/or all of the interspace holes. Where the preform element is a preform ring element it is advantageous that substantially all of the holes of the hollow tubes and/or all of the interspace holes of the preform ring element are intersected by the annular slot. Where the preform element is a preform center element it is preferred that at least the all of the holes of the hollow tubes and/or all of the interspace holes of the preform cladding region or the outer preform cladding region In an embodiment where the preform element is a preform ring element, the method comprises providing an outer ring wall section, an inner ring wall section and a plurality of longitudinal structures and encaging the longitudinal structures in between the outer ring wall section and the inner ring wall section to form longitudinal holes and providing at least one slot extending through the outer ring wall section and intersecting at least one of said longitudinal holes. As mentioned above the preform ring element may comprise additional element such as holding arrangement(s) and/or distance arrangement(s).

The outer ring wall section may have an outer surface providing the outer preform element surface and the method comprises performing the at least one slot to extend from the outer preform element surface and intersecting said longitudinal hole(s). The inner and outer ring wall sections as well as the longitudinal structures may be as described above.

Advantageously the outer ring wall section is an outer hollow cane and the inner ring wall section is an inner hollow cane.

Preferably the encaging of the longitudinal structures in between the outer ring wall section and the inner ring wall section comprises assembling the outer ring wall section and the inner ring wall section with the longitudinal structures in between, optionally arranging holding arrangement(s) and/or distance arrangement(s), and fusing the outer ring wall section and the inner ring wall section together via the longitudinal structures.

In an embodiment the assembling comprising arranging the inner wall section with its outer surface of the inner ring wall to face the inner surface of the outer ring wall and arranging the one longitudinal structures between the outer surface of the inner ring wall and the inner surface of the outer ring wall, such as arranging a plurality of longitudinal structures between the outer surface of the inner ring wall in a ring of longitudinal structures optionally with distance arrangements to provide one or more interspace holes between adjacent longitudinal structures.

In an embodiment the inner and outer ring wall sections are hollow canes and the assembling comprises inserting the inner ring wall section into the outer ring wall section and arranging a plurality of the longitudinal structures between the inner ring wall section and the outer ring wall section optionally with distance arrangements to provide one or more interspace holes between adjacent hollow canes.

In an embodiment the method comprising arranging the longitudinal structures in a side by side configuration to surround the inner ring wall section, to form at least one ring of longitudinal structures, such as two rings of longitudinal structures, such as three rings of longitudinal structures.

Advantageously one or more of the plurality of longitudinal structures are hollow tubes with the longitudinal holes and/or the longitudinal holes are longitudinal interspace holes between the longitudinal structures, wherein the least one slot is provided to intersects at least one of the holes of the hollow tubes and/or at least one of the interspace holes. Preferably all of the longitudinal structures are hollow tubes, optionally including one or more tubes with a plurality of longitudinal holes (multi hollow tubes) substantially parallel to the center axis of the preform element.

In an embodiment the longitudinal structures are arranged in a configuration where the respective longitudinal structures are in contact with adjacent longitudinal structures along their lengths.

In an embodiment the longitudinal structures are arranged in a ring of longitudinal structures in a configuration where the respective longitudinal structures are not in contact with adjacent longitudinal structures thereby forming the longitudinal holes in the form of interspace longitudinal holes as described above. Preferably the method comprises arranging a distance arrangement at two or more positions along the length of the preform ring element for controlling the distance between the longitudinal structures. Thereby the distance arrangements may also be applied for controlling the size of the interspace holes of the longitudinal structures.

In an embodiment the preform element is a preform ring element and a plurality of the longitudinal structures are hollow tubes, each comprising at least one hole and/or the preform comprises a ring of longitudinal structures with interspace holes, the method comprises providing at least one slot extending from the outer preform element surface and intersecting a plurality of the holes and/or interspace holes, wherein the at least one slot does not fully intersect the ring wall. Preferably the at least one slot is an annular slot intersecting a plurality, such as substantially all of the holes and/or interspace holes. The slot may be as described above.

Advantageously, the preform element is at least partly fused prior to performing the slot in order to ensure stability of the preform element during the cutting process. The term "at least partly fused" are intended to mean that the longitudinal structures are fused to adjacent longitudinal structures and or to a structure forming the background material, e.g. the inner and/or the outer hollow cane in the case pf a preform ring element.

The invention also comprises a method of producing a microstructured optical fiber from a preform assembly comprising a preform element as described above and at least one additional preform element.

In an embodiment the method of producing a microstructured fiber comprises a first step of assembling a preform to a preform assembly and a second step of drawing the microstructured optical fiber from the preform assembly while controlling the pressure within the intersected holes of the preform element.

Advantageously the method comprises subjecting the longitudinal holes of said preform element intersected by the slot to a preform ring element controlled pressure during the drawing, wherein the preform ring element controlled pressure is applied via said slot.

In an embodiment the at least one additional preform element is an overcladding tube with a length and a first and a second end and a bore and the preform assembling comprises disposing said preform element into said bore of said overcladding tube to form a preform element-overcladding tube interface, wherein the preform assembly has a first end section comprising said first end of said preform element and said first end of said overcladding tube.

The phrase "preform element-overcladding tube interface" is used to designate an interface between a preform element and an overcladding tube, where the preform element optionally is specified to be a preform ring element or a preform center element.

The phrase "preform ring element-preform center element interface" is used to designate an interface between a preform ring element and a preform center element wherein at least one of the preform elements is according to an embodiment of the invention and the other one of the preform elements may be an additional preform element.

Together the interfaces discussed above are referred to as "elements interface(s)" and each of them is referred to as an elements interface. An elements interface may have an interface void in the form of a void between the preform element and additional preform element forming the elements interface.

The overcladding tube may advantageously be of silica optionally doped e.g. with fluoride.

In an embodiment the preform element is a preform center element.

In an embodiment the preform element is a preform ring element.

In an embodiment the method comprises providing a preform ring element according to an embodiment of the invention and arranging the ring shaped wall to surround an additional preform center element to form a preform ring element-preform center element interface. The additional preform center element and the preform ring element are assembled such that the preform assembly has a first end section comprising the first end of the preform center element and the first end of the preform ring element.

In an embodiment the method of producing a microstructured fiber comprises assembling a preform, and drawing the preform assembly to a microstructured fiber, wherein the assembling of the preform comprises providing an additional preform center element with a length and a first and a second end, an overcladding tube with a length and a first and a second end and a bore and at least one preform ring element e.g. as described above arranging the ring shaped wall to surround the preform center element to form a preform ring element-preform center element interface and arranging the ring shaped wall into the bore of the overcladding tube to form a preform ring element-overcladding tube interface, wherein the preform assembly has a first end section comprising the first end of the preform center element, the first end of the preform ring element and the first end of the overcladding tube.

The (additional) preform center element usually will comprise the material that will provide the core region and normally a part of the cladding region of the microstructured optical fiber. In an embodiment the (additional) preform center element is a hollow preform center element e.g. for providing a hollow fiber.

The (additional) preform center element may comprise any materials which are usually used in prior art preforms.

The terms "core" and "core region" are used interchangeably and the term "cladding" and "cladding region" are used interchangeably.

In an embodiment the method comprises providing a preform center element according to an embodiment of the invention and arranging additional preform ring element to surround the preform center element. The preform center element and the additional preform ring element are assembled such that the preform assembly has a first end section comprising the first end of the preform center element and the first end of the preform ring element.

Prior to assembling of the preform the preform element may be pre-drawn to have a desired outer diameter and/or in the case of a preform ring element to have a desired inner diameter relative to the outer diameter of the additional preform center element—e.g. an inner preform ring element diameter slightly larger than the outer diameter of the additional preform center element. Where there are several preform ring elements to be assembled to the preform assembly these two or more preform ring elements may be pre-drawn simultaneously or separately.

The slot may be provided prior to or after the pre-drawing.

In an embodiment the assembling of the preform comprises providing two or more preform ring elements of an embodiment of the invention and arranging the preform ring elements coaxially with the additional preform center element radially innermost.

In an embodiment the assembling of the preform comprises providing an additional blind preform ring element without longitudinal structures and arranging the preform ring element(s) of an embodiment of the invention and the blind preform ring element(s) coaxially with the additional preform center element radially innermost.

In an embodiment the assembling of the preform comprises providing a preform center element of an embodiment of the invention and an additional preform ring element and arranging the additional preform ring element coaxially with the preform center element radially innermost.

The element may be partly or fully fused prior to drawing, but it may not be necessary to fuse the elements provided that the various elements are fully encaged or locked in the overcladding tube.

After assembling of the preform, the preform assembly is drawn to the microstructured optical fiber e.g. in a drawing tower. Advantageously the preform is held at a first end section near its first end and the microstructured optical fiber is drawn from the second end of the preform at an increased temperature, e.g. as known from prior art fiber drawing methods.

In an embodiment at least one elements interface is subjected to a reduced pressure relative to atmospheric pressure during at least a part of the drawing of the preform assembly to a microstructured fiber.

In an embodiment comprising a preform ring element at least one of the preform ring element-preform center element interface and the preform ring element-overcladding tube-interface are subjected to a reduced pressure relative to atmospheric pressure during at least a part of the drawing of the preform assembly to a microstructured fiber.

The reduced pressure at the elements interface(s) ensures that no air (or other gas) is captured in the respective elements interfaces to form undesired bubbles in the final microstructured optical fiber and the preform element is fully fused to the additional preform element(s).

In an embodiment the preform ring element is fully fused to the (additional) preform center element and/or the preform ring element is fully fused to the overcladding tube in the drawn microstructured optical fiber.

The reduced pressure is advantageously a selectable pressure to be selected by the fiber manufacturer.

In an embodiment the (additional) preform center element comprises at least one hole, such as a hole originating from a hollow tube or a interspace hole, extending along its length, preferably from the first end of the (additional) preform center element and substantially to a second end of the (additional) preform center element, the method comprising subjecting the at least one hole of the (additional) preform center element to a preform center controlled pressure during the drawing.

Where the preform center element is according to an embodiment of the invention the pressure control is advantageously provided via the slot in the preform center element.

The preform center controlled pressure is selected to control the final size of the hole in the microstructured optical fiber. Where the preform center controlled pressure is a reduced pressure relative to atmospheric pressure, the hole may be fully or partly collapsed in the drawn microstructured optical fiber. Where the preform center controlled pressure is atmospheric pressure or is an increased pressure relative to atmospheric pressure, the size of the hole may be adjusted as it is known in the art.

In an embodiment the (additional) preform center element comprises at least a first category hole and at least a second category hole extending in length direction, such as from the first and to the second end of the (additional) preform center element, the method comprising subjecting the at least one first category hole to a first preform center controlled pressure and subjecting the at least one second category hole to a second preform center controlled pressure during the drawing.

In an embodiment the pressure control of the (additional) preform center element hole(s) or of the radially innermost of the first and the second category holes may be provided as described in U.S. Pat. No. 8,215,129 and/or U.S. Pat. No. 6,954,574. Where the preform center element is according to an embodiment of the invention the pressure control of the radially outermost of the first and the second category holes is advantageously provided via the slot in the preform center element.

In an embodiment the preform element comprises at least one hollow tube with a hole and/or at least one interspace hole extending in length direction, such as from the first end of the preform element to the second end of the preform element and the method comprising subjecting the at least one hole of the preform element to a preform element controlled pressure during the drawing.

Advantageously the holes intersected by the slot are subjected to the preform element controlled pressure during the drawing via the slot.

The preform element controlled pressure is selected to control the final size of the intersected hole originating from the preform element in the drawn microstructured optical fiber. The preform element controlled pressure may be a reduced pressure relative to atmospheric pressure, atmospheric pressure or an increased pressure relative to atmospheric pressure to adjust the size of the hole in the drawn microstructured optical fiber.

Preferably the preform element controlled pressure is controlled independently of at least one other controlled pressure during the drawing, such as the preform center controlled pressure subjected to holes of an additional preform center element.

Advantageously the at least one slot is positioned at an end section of the preform ring element protruding beyond the overcladding tube in the assembled preform. Thereby the preform element controlled pressure can be applied at the end section not covered by the overcladding tube via the slot. The slot is preferably positioned at a distance from the first end of the preform element which is up to 1/10 of the length of the preform ring element, the distance is preferably at least about 5 mm or longer, such as about 1 cm to about 20 cm as described above.

In an embodiment the first end of the (additional) preform center element, the first end of the (additional) preform ring element and the first end of the overcladding tube are sequentially offset at the preform end section, such that the end section of the (additional) preform ring element protrudes beyond the end of the overcladding tube and preferably such that an end section of the (additional) preform center element protrudes beyond the end of the (additional) preform ring element. At least one and optionally both of the (additional) preform center element and the (additional) preform ring element is according to an embodiment of the invention.

By this arrangement it is convenient to apply a reduced pressure to the respective elements interface as well as a preform element controlled pressure via the slot of the preform center element and/or the preform ring element and optionally an additional preform center controlled pressure applied at the end of the (additional) preform center element. The respective pressure controls may be applied at separate sections along the end section of the preform assembly with sequentially offset preform center element first end, preform ring element first end and overcladding tube first end, preferably with seals between the separate sections.

In an embodiment the one or more pressure controls are provided by enclosing the end section of the preform assembly by a pressure control cap comprising two or more pressure control sections and applying seals to seal off independently pressure controlled holes, comprising at least a pair of slot seals on opposite side of the slot. Preferably the intersected holes are closed at a position from the first end of the preform element to the intersection slot, such as at the first end of the preform element and/or at the intersection towards the first end and/or at an additional intersecting slot. Each of the pair of slot seals is preferably forming an annular seal between the pressure control cap and the outer preform element surface of the end section of the preform element.

Preferably the drawing of the preform assembly comprising drawing the preform assembly to the microstructured optical fiber in a drawing tower, wherein the preform assembly is subjected to at least one pressure control at its first end section, preferably two or more independently controlled pressure controls.

In an embodiment the drawing of the preform assembly comprising drawing the preform assembly from its second end section at an increase temperature.

The invention also comprises a microstructured optical fiber obtainable by the method described above.

All features of the inventions and embodiments of the invention as described above including ranges and preferred ranges can be combined in various ways within the scope of the invention, unless there are specific reasons not to combine such features.

BRIEF DESCRIPTION OF THE DRAWINGS

The above and/or additional objects, features and advantages of the present invention will be further elucidated by the following illustrative and non-limiting description of embodiments of the present invention, with reference to the appended drawings.

FIG. 2*a* is a cross-sectional view of an embodiment of a preform ring element of an embodiment of the invention with hollow tubes.

FIG. 2*b* is a section of an image of a cross-sectional view of an embodiment of a preform ring element corresponding to the embodiment of FIG. 2*a* where the preform ring element has been fused and pre-drawn.

FIG. 4*b* is a section on an image of a cross-sectional view of an embodiment of a preform ring element corresponding to the embodiment of FIG. 4*a* where the preform ring element has been fused and pre-drawn.

The figures are schematic and may be simplified for clarity. Throughout, the same reference numerals are used for identical or corresponding parts.

Further scope of applicability of the present invention will become apparent from the description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

Figure 1:
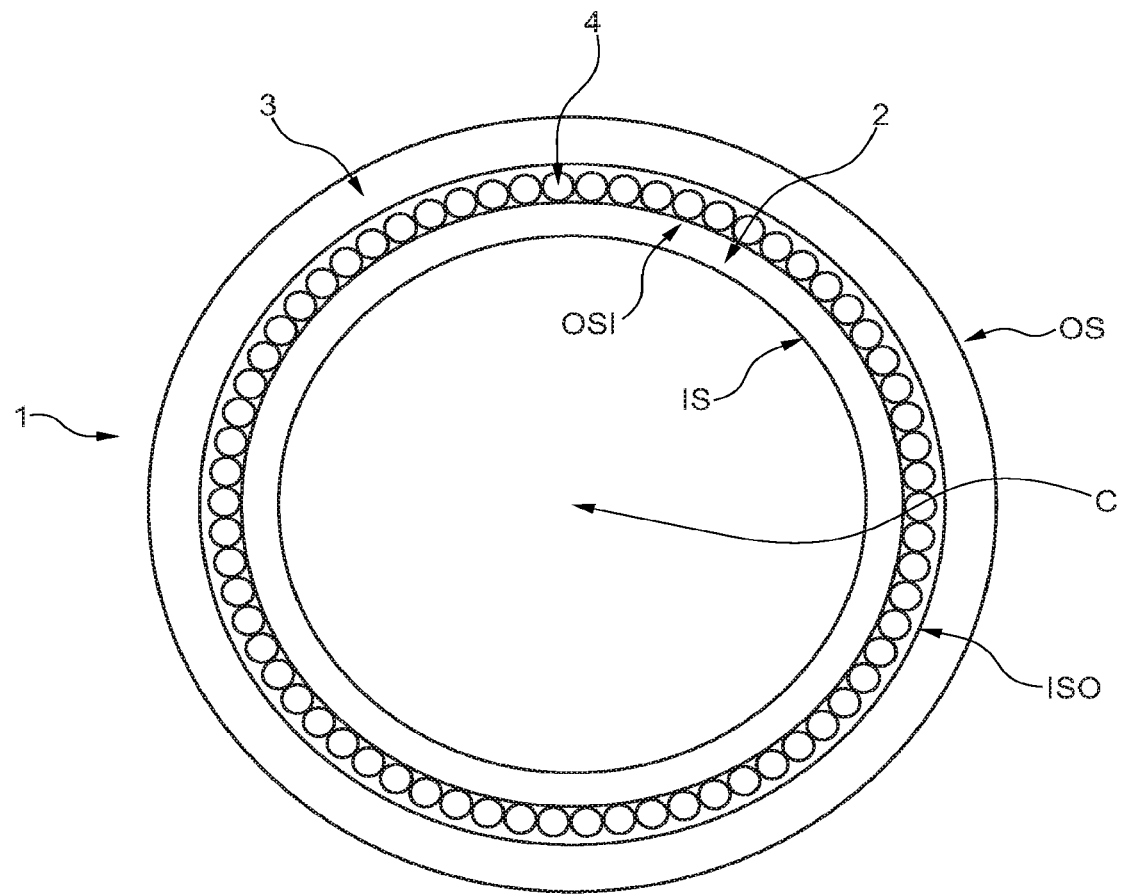
FIG. 1 is a cross-sectional view of an embodiment of a preform ring element of an embodiment of the invention with solid structures and/or hollow canes.

The preform ring element shown in FIG. 1 comprises a ring shaped wall 1 with a length which is perpendicular to the cross-sectional view and a center axis C. The ring shaped wall 1 has an outer preform element surface OS defining the outer diameter OD and an inner preform element surface IS defining the inner diameter ID.

The preform ring element comprises a ring wall background material provided by an inner hollow cane 2 and an outer hollow cane 3 and a plurality of longitudinal structures 4, wherein at least one is a hollow tube encaged in the ring wall background material and extending in the length direction of the preform ring element. A not shown slot is provided from the outer surface OS and intersecting at least one hole of the hollow tube of the longitudinal structures 4.

The inner cane 2 and outer cane 3 may be as described above. In the shown embodiment the inner hollow cane 2 has a thinner wall thickness than the outer hollow cane 3 and advantageously the inner hollow cane may be fluorine doped. The outer preform element surface OS is provided by the outer surface of the outer hollow cane 3 and the hollow outer cane 3 has an inner surface ISO. The inner preform element surface is provided by the inner surface of the inner hollow cane 2 and the inner hollow cane 2 further has an outer surface OSI.

The longitudinal structures 4 comprise at least one hollow tube and the remaining may be solid structures and/or hollow tubes. Preferably the longitudinal structures 4 are hollow tubes e.g. in the form of capillary tubes.

The longitudinal structures 4 are arranged in a side by side configuration along the ring shape of the ring shaped wall to form a ring of longitudinal structures.

The preform ring element shown in FIGS. 2*a* and 2*b* comprises a ring shaped wall 11 with a length which is perpendicular to the cross-sectional view and a center axis The ring shaped wall 11 has an outer preform element surface OS defining the outer diameter OD and an inner preform element surface IS defining the inner diameter ID. The preform ring element comprises a ring wall background material provided by an inner hollow cane 12 and an outer hollow cane 13 and a plurality of longitudinal structures 14 encaged in the ring wall background material and extending in the length direction of the preform ring element.

The longitudinal structures 14 are in the form of hollow tubes each comprising a longitudinal hole 14*a*. The hollow tubes 14 are encaged between the inner hollow cane 12 and the outer hollow cane 13. A not shown slot is provided from the outer surface OS and intersecting at least one hole of the hollow tubes 14.

In FIG. 2*b* the preform ring element has been fused and pre-drawn and it can be seen that interstices between the hollow tubes 14 and respectively the inner hollow cane 12 and the outer hollow cane 13 have been removed and further the hollow tubes have been deformed to be substantially square shaped.

Figure 3:
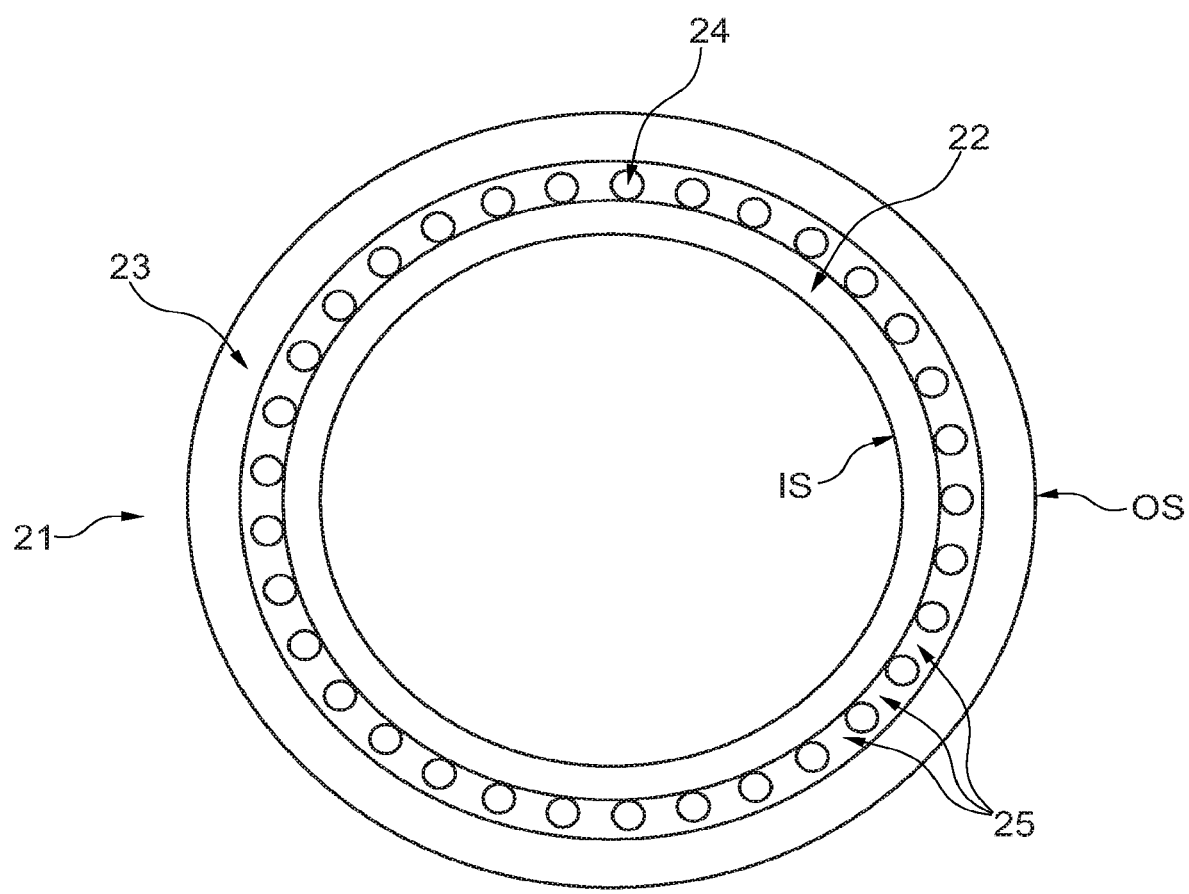
FIG. 3 is a cross-sectional view of an embodiment of a preform ring element of an embodiment of the invention with interspace holes.

The preform ring element shown in FIG. 3 comprises a ring shaped wall 21 with a length which is perpendicular to the cross-sectional view and a center axis The ring shaped wall 21 has an outer preform element surface OS defining the outer diameter OD and an inner preform element surface IS defining the inner diameter ID.

The preform ring element comprises a ring wall background material provided by an inner hollow cane 22 and an outer hollow cane 23 and a plurality of longitudinal structures 24 encaged in the ring wall background material and extending in the length direction of the preform ring element.

The longitudinal structures 24 are solid structures and/or hollow canes. Preferably the longitudinal structures 24 are hollow tubes e.g. in the form of capillary tubes.

The longitudinal structures 24 are encaged between the inner hollow cane 22 and the outer hollow cane 23.

The longitudinal structures 24 are arranged in a ring of non-contacting longitudinal structures where the longitudinal structures are arranged in a configuration where they are not in contact with adjacent longitudinal structures along their lengths thereby forming interspace holes 25. A not shown slot is provided from the preform element outer surface OS and intersecting at least one hole of the interspace holes 25.

To hold the longitudinal structures in position, not shown distance arrangements are advantageously arranged at two or more positions along the length of the preform ring element as described above.

Figure 4A:
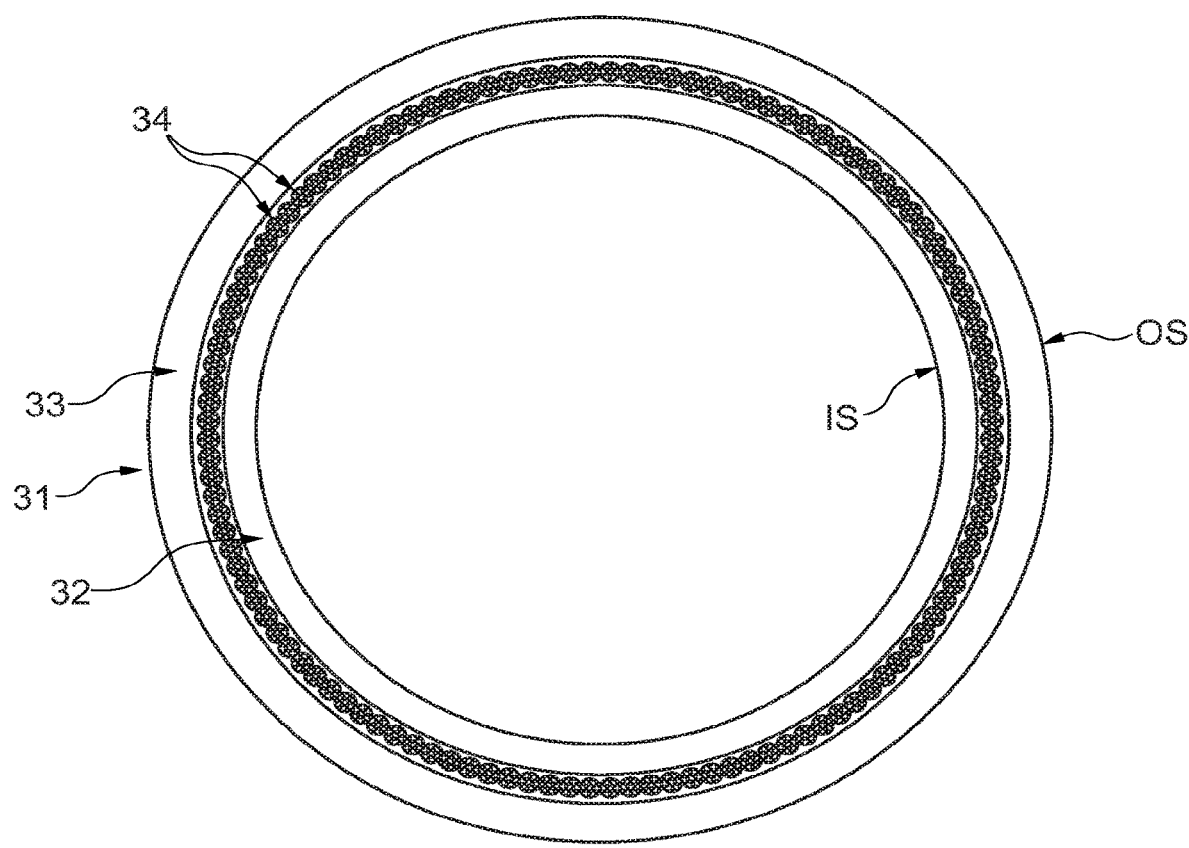
FIG. 4*a* is a cross-sectional view of an embodiment of a preform ring element of an embodiment of the invention with multi-hollow tubes.

The preform ring element shown in FIGS. 4a and 4b comprises a ring shaped wall with a length which is perpendicular to the cross-sectional view and a center axis The ring shaped wall has an outer preform element surface OS defining the outer diameter OD and an inner preform element surface IS defining the inner diameter ID. The preform ring element comprises a ring wall background material provided by an inner hollow cane 32 and an outer hollow cane 33 and a plurality of longitudinal structures in the form of multi-hollow tubes 34 encaged in the ring wall background material and extending in the length direction of the preform ring element.

The multi-hollow tubes 34 each comprise a plurality of longitudinal holes extending in the length direction thereof.

Multi-hollow tubes 34 are very advantageous to use in the preform ring element or in a preform center element where a slot is to intersect at least some of the holes, because in such situation it may be sufficient to intersect some of the holes while still obtaining a desired air fraction, which air fraction can be controlled by the preform element controlled pressure during drawing of the microstructured optical fiber.

In FIG. 4b the preform ring element has been fused and pre-drawn and it can be seen that interstices between the multi-hollow tubes 34 and respectively the inner hollow cane 32 and the outer hollow cane 33 have been removed and further the hollow tubes have been deformed to be substantially square shaped.

Figure 5A:
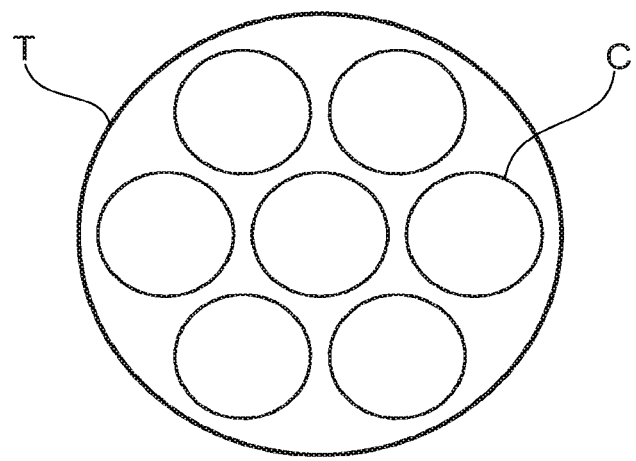
FIG. 5*a* is a cross-sectional view of a multi-hollow tube with 7 holes.

In FIG. 5a is an example of a multi-hollow tube with 7 holes suitable for use in an embodiment of a preform element of an embodiment of the invention, such as a preform ring element or a preform center element.

In FIG. 5a is an example of a multi-hollow tube with 7 holes suitable for use in an embodiment of a preform ring element of an embodiment of the invention, such as a preform ring element or a preform center element.

Figure 5B:
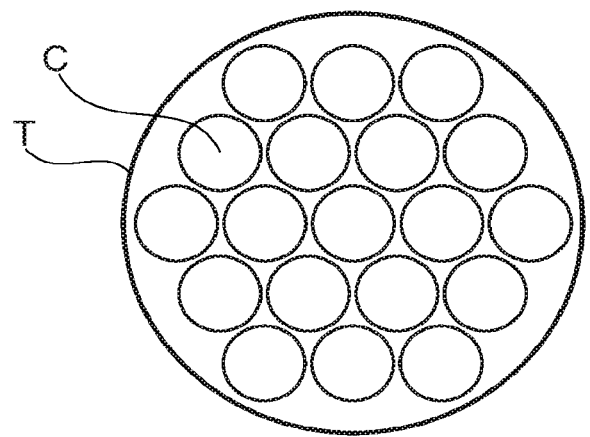
FIG. 5*b* is a cross-sectional view of a multi-hollow tube with 19 holes.

In FIG. 5b is an example of a multi-hollow tube with 19 holes suitable for use in an embodiment of a preform ring element of an embodiment of the invention, such as a preform ring element or a preform center element.

The multi-hollow tubes are for example produced by stacking a number (corresponding to the desired number of holes) of capillary tubes C and arranging them in a larger hollow tube T and pre-drawing the assembly under pressure control of the holes to ensure that they do not collapse and to obtain a desired outer diameter of the multi-hollow tube. Advantageously a very long multi-hollow tube is drawn and thereafter the long multi-hollow tube is cut into several multi-hollow tubes of suitable lengths.

Figure 6:
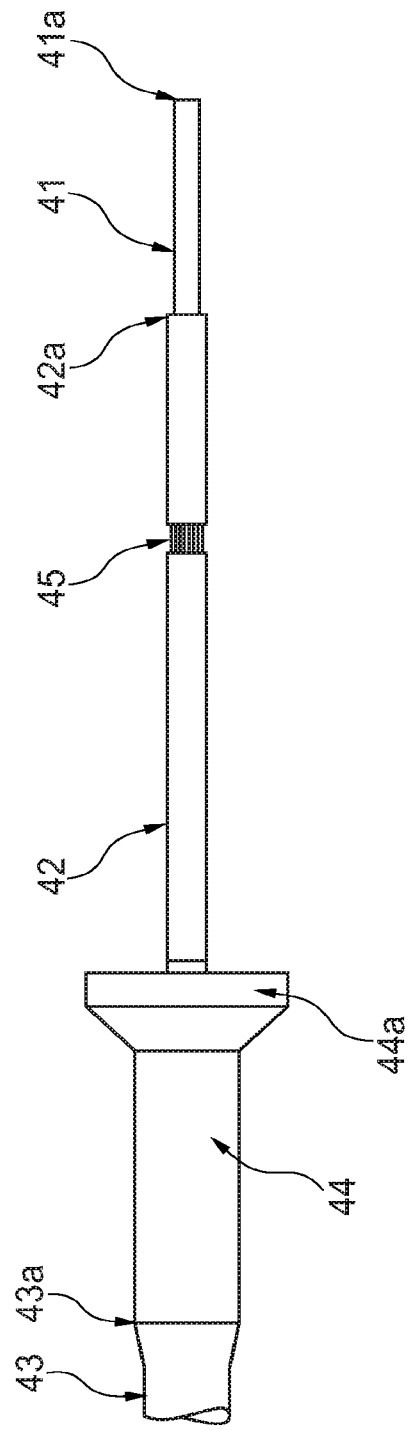
FIG. 6 is a side view of an end section of a preform comprising a preform ring element with a slot.

The preform assembly of which the end section is shown in FIG. 6 comprises an additional preform center element 41, a preform ring element 42 of an embodiment of the invention and an additional preform element in the form of an overcladding tube 43. In an alternative not shown embodiment the preform ring element is switched with an additional preform ring element and the additional preform center element is a preform center element according to an embodiment of the invention.

A holder 44 is mounted to hold the overcladding tube 43 as well as the additional preform center element 41 and the preform ring element 42 in position. The holder 44 may also be used for mounting a not shown pressure control cap e.g. to a collar section 44a of the holder.

The preform ring element 42 comprises a slot 45 intersecting a plurality of holes of the preform ring element 42. The intersected holes are closed at the first end 42a of the preform ring element 42.

The first end 41a of the additional preform center element 41, first end 42a of the preform ring element 42 and the first end 43a of the overcladding tube 43 are sequentially offset at the preform end section, such that an end section of the preform ring element comprising the slot 45 protrudes beyond the end of the overcladding tube 43 and such that an end section of the additional preform center element 41 protrudes beyond the end 42a of the preform ring element 42.

In a variation of the embodiment shown in FIG. 6 the preform assembly does not comprise an overcladding tube and the holder 44 is mounted to hold and control the stability of the preform assembly during drawing, e.g. with a not shown guide tube arranged instead of the overcladding tube.

Figure 7A:
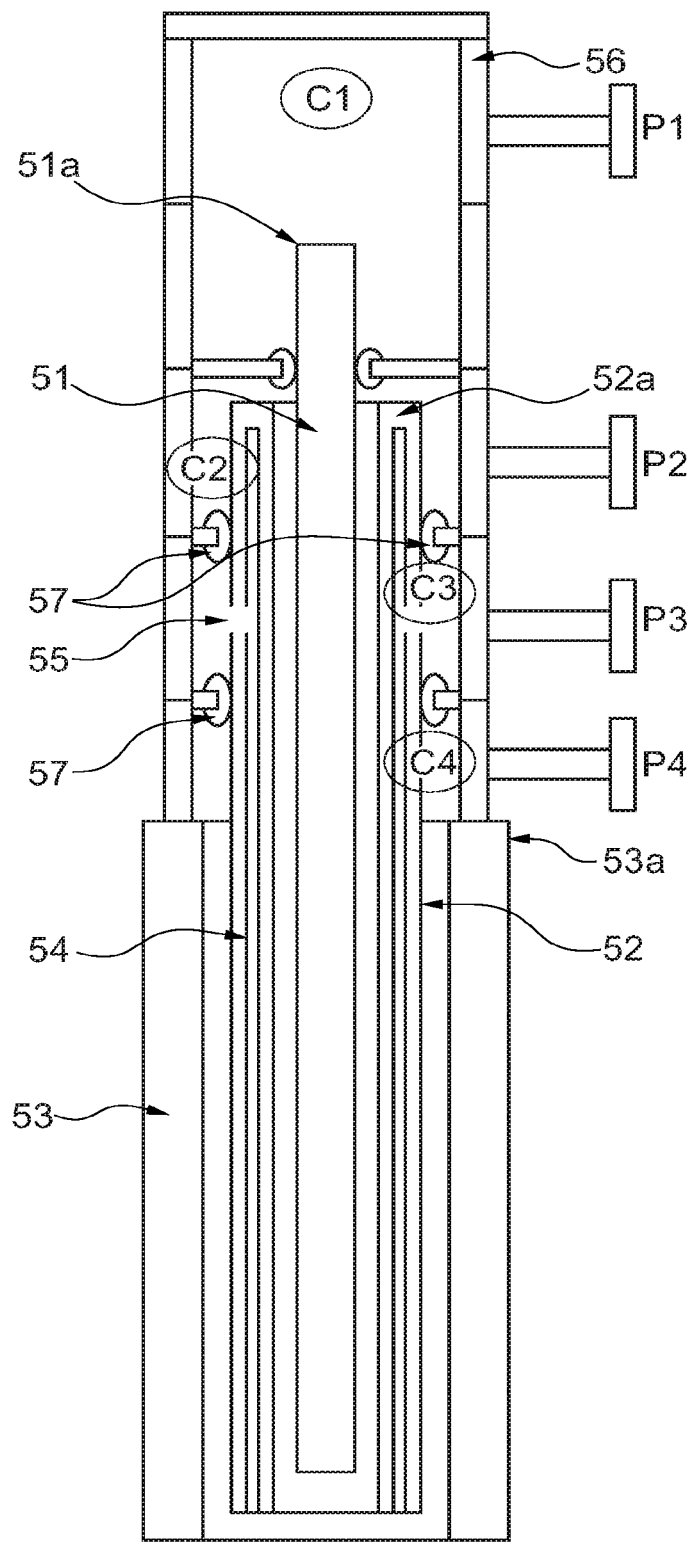
FIG. 7*a* is a schematic illustration of an end section of a preform assembly comprising a preform ring element mounted with a pressure controlling arrangement.

The preform assembly of which the end section is shown in FIG. 7a comprises an additional preform center element 51, a preform ring element 52 of an embodiment of the invention and an overcladding tube 53. The end section of the preform assembly is mounted with a pressure controlling arrangement comprising a pressure control cap 56 and with a pressurization arrangement comprising number of pressure tubes connections P1, P2, P3 and P4.

The preform ring element 52 comprises a slot 55 intersecting a plurality of holes 54 of the preform ring element 52. The intersected holes are closed at the first end 52a of the preform ring element 52.

The first end 51a of the additional preform center element 51, first end 52a of the preform ring element 52 and the first end 53a of the overcladding tube 53 are sequentially offset at the preform assembly end section, such that an end section of the preform ring element comprising the slot 55 protrudes beyond the end of the overcladding tube 53a and such that an end section of the additional preform center element 51 protrudes beyond the end 52a of the preform ring element 52.

The overcladding tube 53 is mounted to the pressure control cap 56 at its first end 53a to thereby provide a number of chambers—here 4 chambers C1, C2, C3 and C4 separated by various seals 57.

The additional preform center element 51 comprises a number of not shown holes which terminate at the first end 51a of the additional preform center element 51, such that the not shown holes of the additional preform center element 51 are in fluid communication with the a first chamber C1 such that the pressure within these holes can be controlled in the first chamber C1 via pressure tube connection P1.

The first end 52a of the preform ring element 52 is located in a second chamber C2 where the pressure can be controlled via pressure tube connection P2 and interface void formed by the preform ring element-preform center interface is in fluid communication with the second chamber C2 to thereby apply a reduced pressure at the preform ring element-preform center interface.

The slot 55 is located in a third chamber C3 where the pressure can be controlled via pressure tube connection P3, such that the intersected holes of the preform ring element 52 are in fluid communication with the third chamber C3 via the slot 55, to thereby control the pressure in the intersected holes of the preform ring element 52.

The pressure of the preform ring element-overcladding tube interface is in fluid communication with a fourth chamber C4, such that the pressure can be controlled via pressure tube connection P4 thereby apply a reduced pressure at the preform ring element-overcladding tube interface, such that the interface void is closed in the drawn fiber.

Many other configurations may be applied to provide individual control of respective holes and/or interfaces.

Figure 7B:
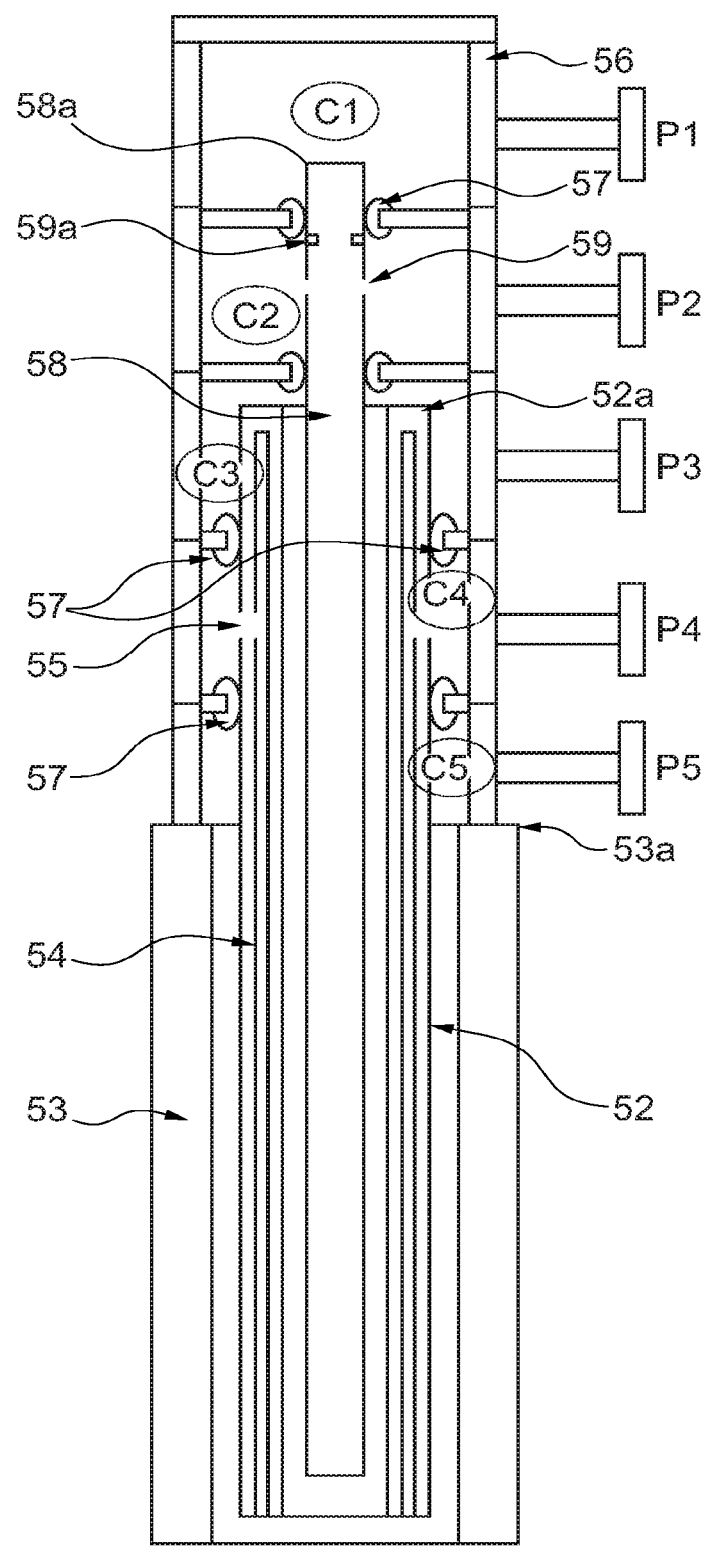
FIG. 7*b* is a schematic illustration of an end section of a preform assembly comprising a preform ring element and a preform element mounted with a pressure controlling arrangement.

The preform assembly of which the end section is shown in FIG. 7b is a variation of the preform assembly shown in FIG. 7a, where both the preform center element and the preform ring element is according to an embodiment of the invention. The preform assembly comprises a preform center element 58, a preform ring element 52 and an overcladding tube 53. The end section of the preform assembly is mounted with a pressure controlling arrangement comprising a pressure control cap 56 and with a pressurization arrangement comprising number of pressure tubes connections P1, P2, P3, P4 and P5.

The preform ring element 52 comprises a slot 55 intersecting a plurality of holes 54 of the preform ring element 52. The intersected holes are closed at the first end 52a of the preform ring element 52.

The preform center element 58 comprises a number of the not shown longitudinal holes which terminate at the first end 58a of the preform center element 58. The preform center element comprises a slot 59 intersecting some of the not shown holes of the preform center element 58, such as all of the longitudinal holes of the preform center element 58 or the radially outermost longitudinal holes of the preform center element 58 adapted to provide an outer cladding and/or an air cladding. In the present embodiment the preform center element may have a number of not intersected longitudinal holes arranged radially inwards to the intersected longitudinal holes. Such not intersected holes may e.g. be adapted to form part of a core region and/or an inner cladding region of the final optical fiber drawn from the preform assembly. The intersected holes are closed at a further slot 59a which is for example filled with a sealing material such as epoxy or silica or the section above the further slot 59a is simply collapsed.

The first end 58a of the preform center element 58, first end 52a of the preform ring element 52 and the first end 53a of the overcladding tube 53 are sequentially offset at the preform assembly end section, such that an end section of the preform ring element 52 comprising the slot 55 protrudes beyond the end of the overcladding tube 53a and such that an end section of the preform center element 58 comprising the slot 59 protrudes beyond the end 52a of the preform ring element 52.

The overcladding tube 53 is mounted to the pressure control cap 56 at its first end 53a to thereby provide a number of chambers—here 5 chambers C1, C2, C3, C4 and C5 separated by various seals 57.

The not intersected longitudinal holes of the preform center element 58 which terminate at the first end 58a of the preform center element 58 are in fluid communication with the a first chamber C1 such that the pressure within these holes can be controlled in the first chamber C1 via pressure tube connection P1.

The slot 59 in the preform center element 58 is located in the second chamber C2 where the pressure can be controlled via pressure tube connection P2, such that the intersected holes of the preform element 58 are in fluid communication with the second chamber C2 via the slot 59 to thereby control the pressure in the intersected holes of the preform element 58.

The first end 52a of the preform ring element 52 is located in the third chamber C3 where the pressure can be controlled via pressure tube connection P3 and the preform ring element-preform center interface is in fluid communication with the third chamber C3 to thereby apply a reduced pressure at the preform ring element-preform center interface.

The slot 55 in the preform ring element 52 is located in the fourth chamber C4 where the pressure can be controlled via pressure tube connection P4, such that the intersected holes of the preform ring element 52 are in fluid communication with the fourth chamber C4 via the slot 55, to thereby control the pressure in the intersected holes of the preform ring element 52.

The pressure of the preform ring element-overcladding tube interface is in fluid communication with the fifth chamber C5, such that the pressure can be controlled via pressure tube connection P5 thereby apply a reduced pressure at the preform ring element-overcladding tube interface.

Many other configurations may be applied to provide individual control of respective holes and/or interfaces.

Figure 8:
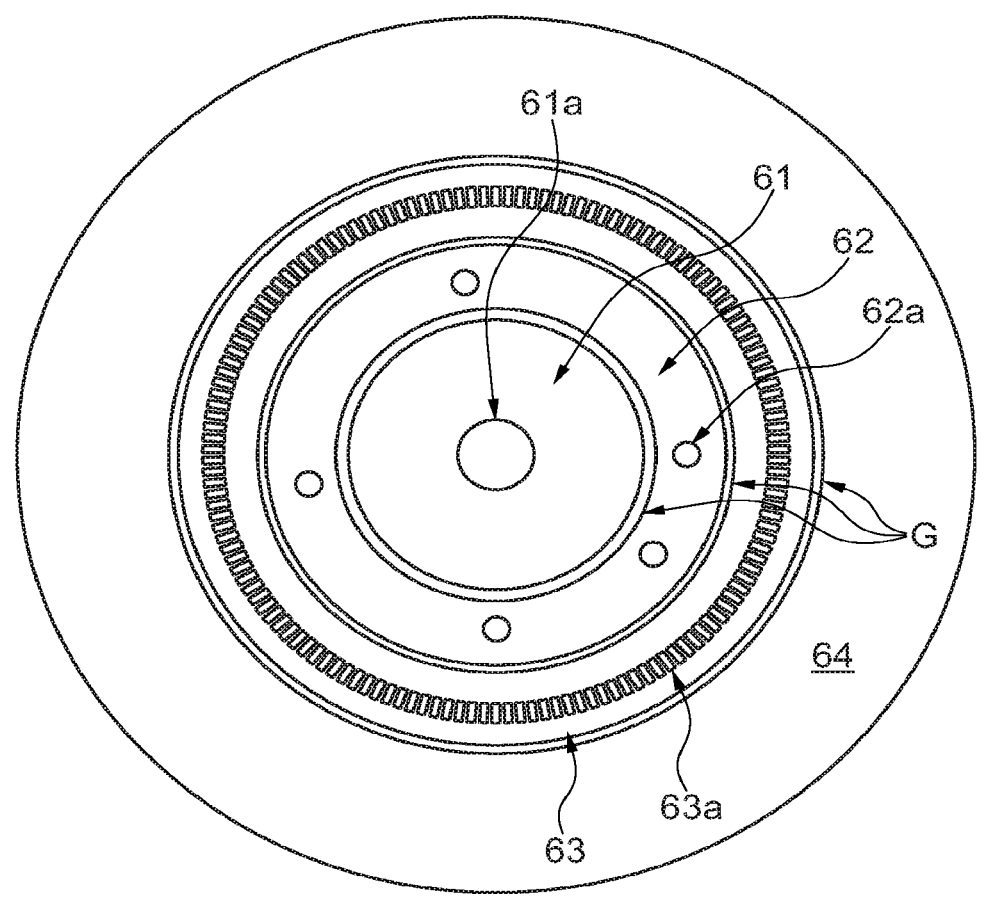
FIGS. 8, 9, 10 and 11 are cross-sectional views of assembled preforms, each comprising a preform ring element.

The assembled preform shown in FIG. 8 is adapted for providing a double clad microstructured optical fiber with an inner cladding region and an outer cladding region separated by an air cladding ring. The preform assembly comprises an additional preform center element 61 surrounded by a first preform ring element 62, which is surrounded by a second preform ring element 63 which is surrounded by an overcladding tube 64.

The additional preform center element 61 comprises a doped center area 61a for providing the core region of the microstructured optical fiber.

The first preform ring element 62 comprises a number of holes 62a provided by hollow tubes or interspace holes as described above. The holes 62a are asymmetrically arranged and have the function of providing a scrambler-element in the inner cladding region of the final microstructured optical fiber to remove undesired screw rays in the inner cladding region.

The second preform ring element 63 comprises a ring of holes 63a, which ring of holes in the final microstructured optical fiber provides the air cladding ring which ensures that selected wavelengths of light can be guided in the inner cladding region.

The holes of the ring of holes 63a are approximately rectangular with a large cross dimension and a short cross dimension and arranged with their respective large cross dimension substantially in radial direction. Thereby longer bridges are arranged between adjacent holes of the ring of holes, which in the microstructured optical fiber results in a high quality air clad for ensuring guiding light in the inner cladding region with desired wavelengths e.g. reaching below 2 μm such as below 1 μm or even below 500 nm. In an alternatively not shown embodiment the holes of the ring of holes are approximately square or approximately rectangular and arranged with their respective shorter cross dimension substantially in radial direction. Thereby the bridge becomes relatively short, which may be an advantage if the fiber is to be cleaved.

As it can be seen the respective preform elements, the additional preform center element 61, the first preform ring element 62, the second preform ring element 63 and the overcladding tube 64 are arranged with small gaps G. These gaps G may advantageously be removed before the drawing of the microstructured optical fiber e.g. by fusion. Alternatively these gaps G will be removed during drawing of the microstructured optical fiber.

In a variation of the preform assembly of FIG. 8 the additional preform center element is according to an embodiment of the invention and one or both of the preform ring elements is/are additional preform ring element(s).

Figure 9:
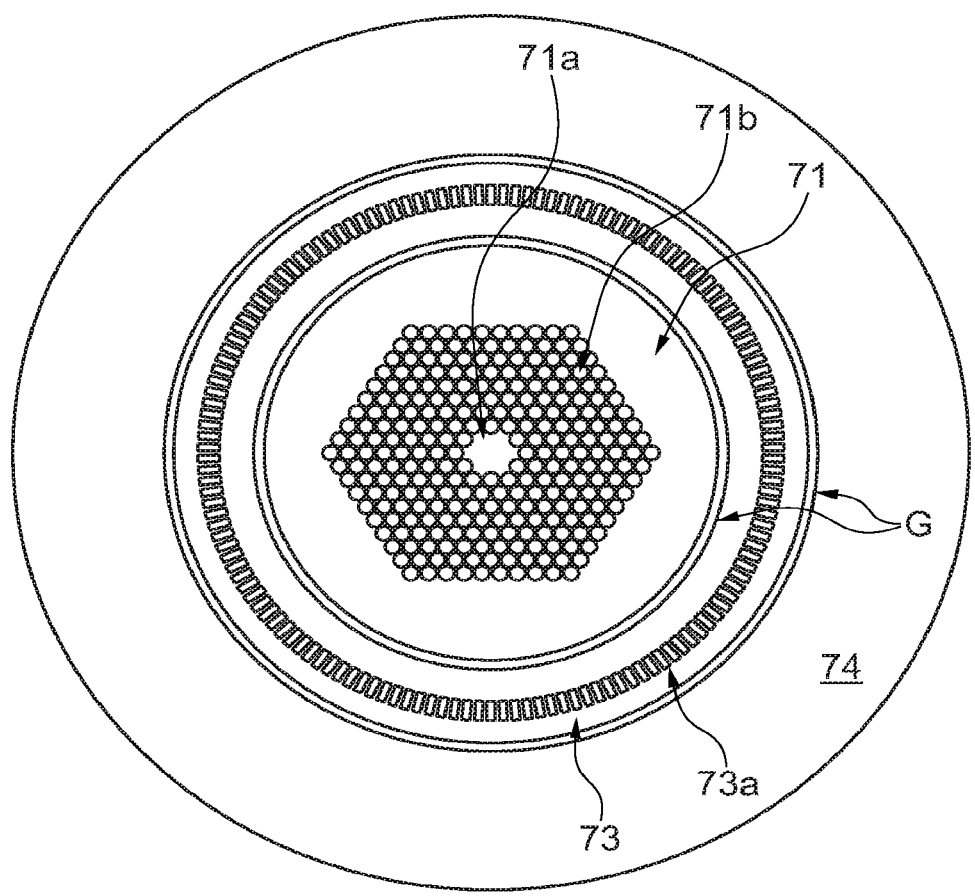

The assembled preform shown in FIG. 9 is adapted for providing a double clad hollow core microstructured optical fiber with an inner cladding region and an outer cladding region separated by an air cladding ring. The preform assembly comprises an additional preform center element 71 surrounded by a preform ring element 73, which is surrounded by an overcladding tube 74.

The additional preform center element 71 comprises a plurality of capillary tubes 71b arranged to provide a relative large center hole 71a, which in the final microstructured optical fiber will provide the hollow core region.

The preform ring element 73 comprises a ring of holes 73a, which ring of holes in the final microstructured optical fiber provides the air cladding ring which ensures that selected wavelengths of light can be guided in the inner cladding region.

In a variation of the preform assembly of FIG. 9 the additional preform center element is according to an embodiment of the invention and the preform ring element is an additional preform ring element.

Figure 10:
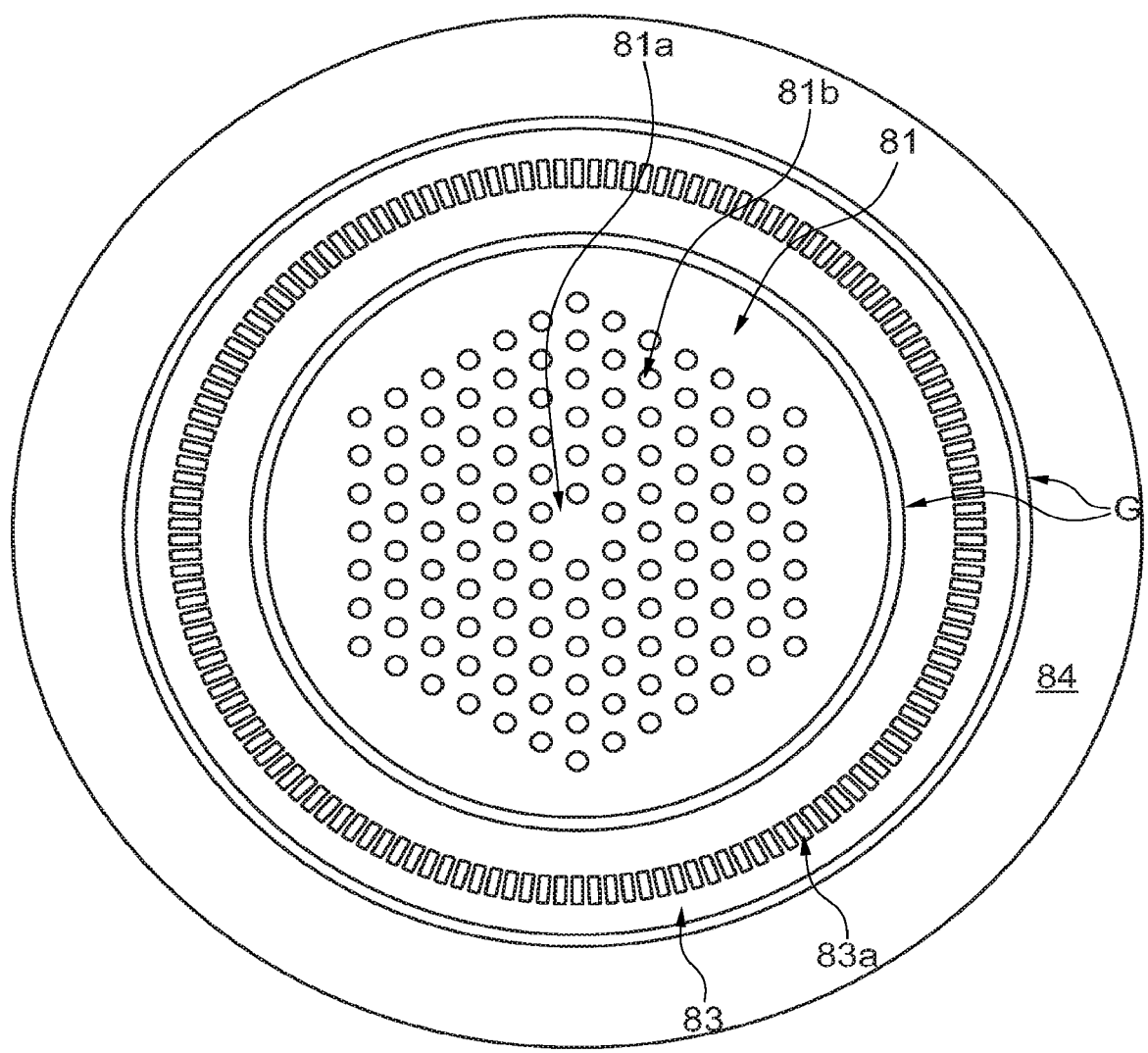

The assembled preform shown in FIG. 10 is adapted for providing a double clad solid core microstructured optical fiber with an inner cladding region and an outer cladding region separated by an air cladding ring.

The preform assembly comprises an additional preform center element 81 surrounded by a preform ring element 83, which is surrounded by an overcladding tube 84.

The additional preform center element 81 comprises a plurality of capillary tubes 81b with larger wall thickness than the capillary tubes 71b used in the embodiment of FIG. 9. The capillary tubes 81b are arranged in a hexagonal pattern to provide that the encircled center region 81a in the final microstructured optical fiber will provide the solid core region.

The preform ring element 83 comprises a ring of holes 83a, which ring of holes in the final microstructured optical fiber provides the air cladding ring which ensures that selected wavelengths of light can be guided in the inner cladding region.

In a variation of the preform assembly of FIG. 10 the additional preform center element is according to an embodiment of the invention and the preform ring element is an additional preform ring element.

Figure 11:
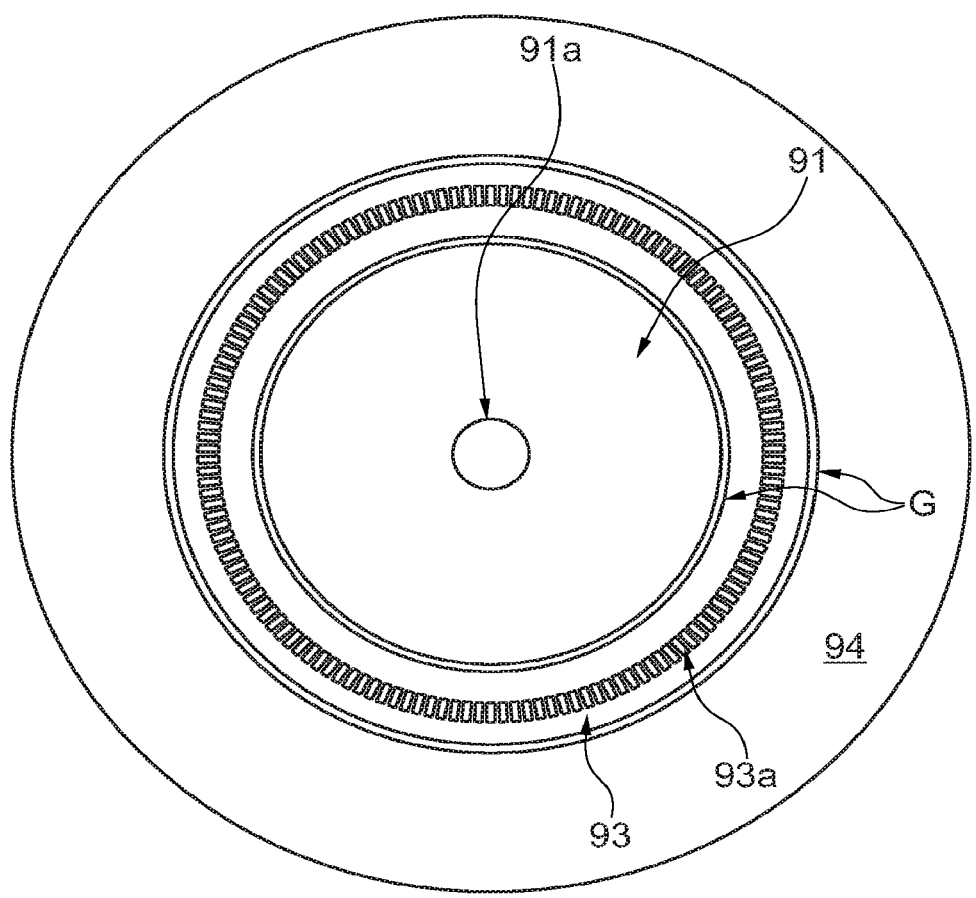

The assembled preform shown in FIG. 11 is adapted for providing a double clad solid doped core microstructured optical fiber with an inner cladding region and an outer cladding region separated by an air cladding ring.

The preform comprises an additional preform center element 91 surrounded by a preform ring element 93, which is surrounded by an overcladding tube 94.

The additional preform center element 91 comprises a doped center region 91a which in the final microstructured optical fiber will provide the solid doped core region.

The additional preform ring element 93 comprises a ring of holes 93a, which ring of holes in the final microstructured optical fiber provides the air cladding ring which ensures that selected wavelengths of light can be guided in the inner cladding region.

Figure 12:
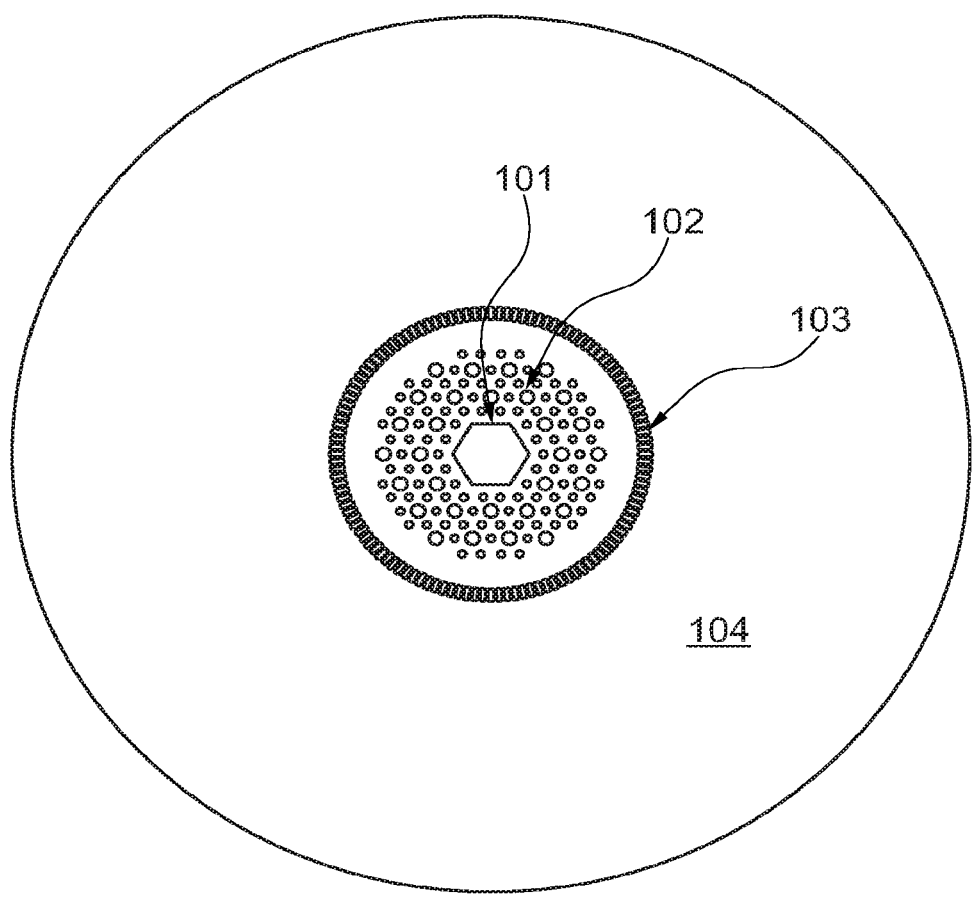
FIGS. 12, 13 and 14 are cross-sectional views of drawn microstructured optical fibers from preform assemblies, each comprising a preform ring element according to an embodiment of the invention.

The microstructured optical fiber drawn from a preform assembly comprising a preform ring element and as shown in FIG. 12 comprises a core region 101, an inner cladding region 102, an outer cladding region 104, and an air clad 103 separating the inner cladding region 103 and the outer cladding region 104. The air clad 103 originates from a ring of holes in a preform ring element of an embodiment of the invention. The core region is a hollow core and the inner cladding region comprises a plurality of hole microstructures arranged in a pattern to confine light to be guided in the hollow core.

Figure 13:
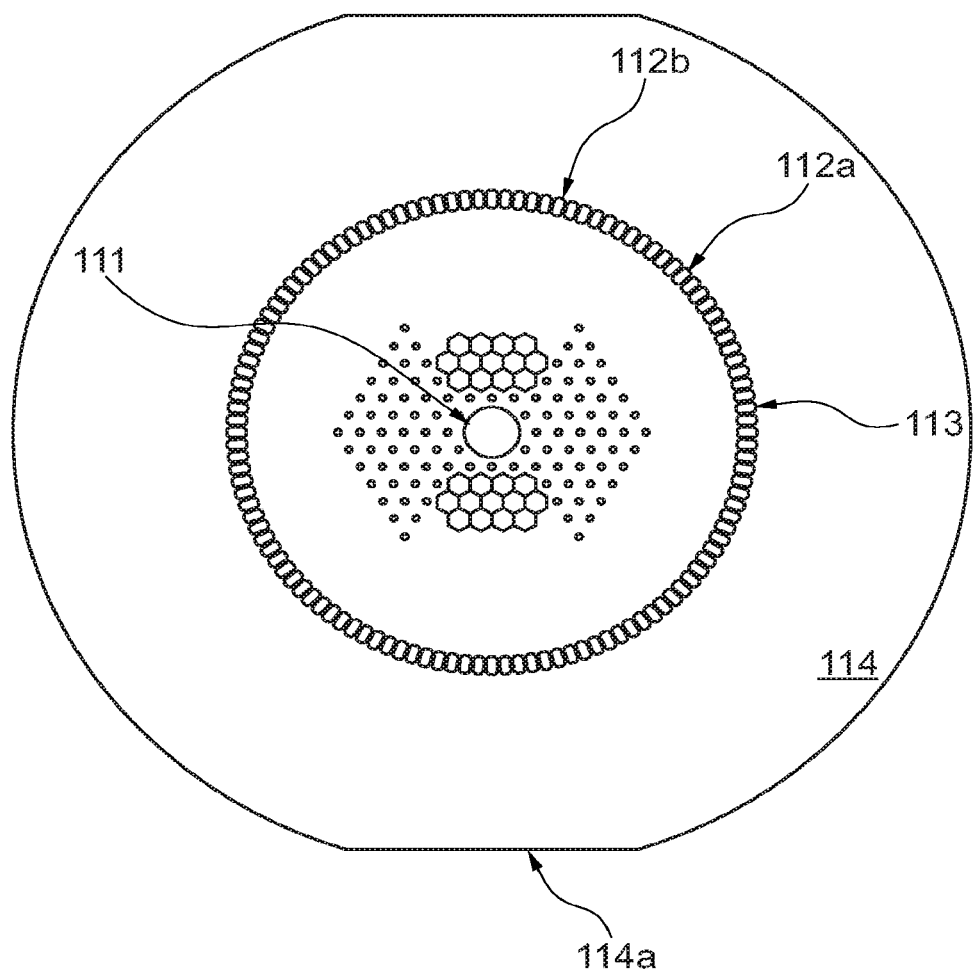

The birefringent microstructured optical fiber drawn from a preform assembly comprising a preform ring element and as shown in FIG. 13 comprises a core region 111, an inner cladding region 112, an outer cladding region 114, and an air clad 113 separating the inner cladding region 113 and the outer cladding region 114. The air clad 113 originates from a ring of holes in a preform ring element of an embodiment of the invention.

The core region is a solid core optionally doped. The inner cladding region comprises a plurality of hole microstructures 112a and a plurality of boron doped microstructures 112b arranged in a twofold rotational symmetrical pattern to provide the fiber with birefringence. The outer periphery of the microstructured optical fiber has two oppositely planar surface sections 114a correlated with the birefringence.

Figure 14:
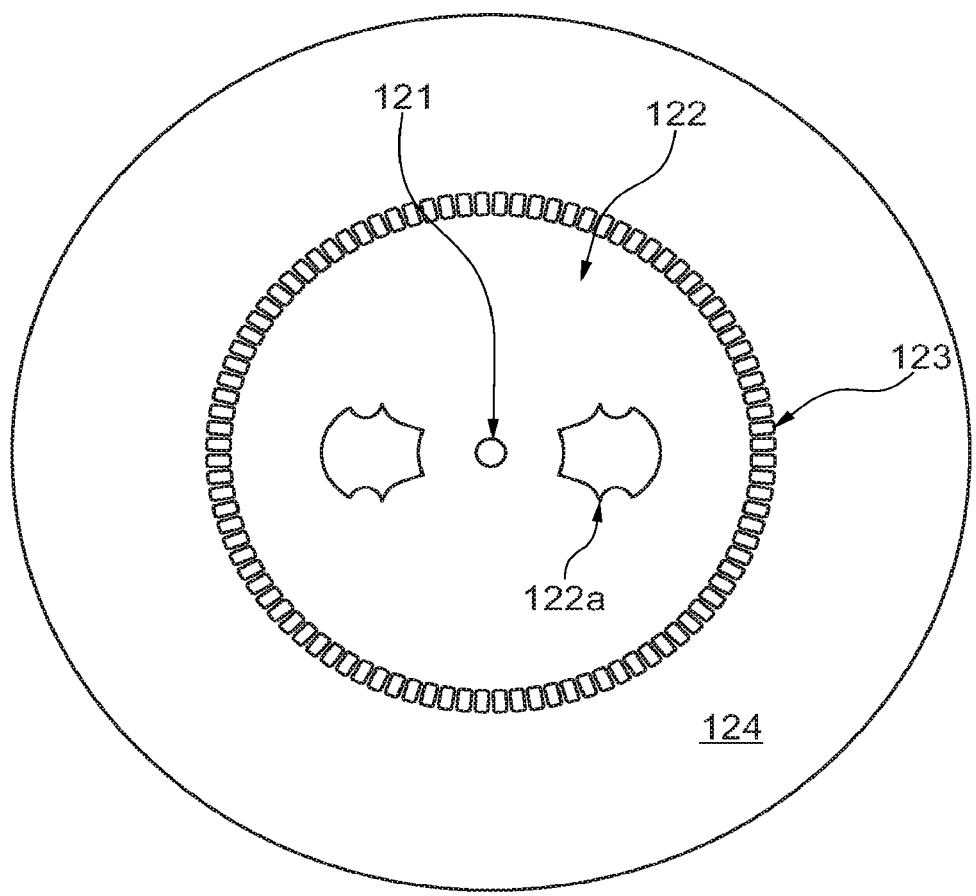

A solid microstructured optical fiber drawn from a preform assembly comprising a preform ring element and as shown in FIG. 14 comprises a core region 121, an inner cladding region 122, an outer cladding region 124, and an air clad 123 separating the inner cladding region 123 and the outer cladding region 124. The air clad 123 originates from a ring of holes in a preform ring element of an embodiment of the invention.

The core region 121 is a solid doped core. The inner cladding region comprises a two relatively large boron doped structures 122a.

Figure 15:
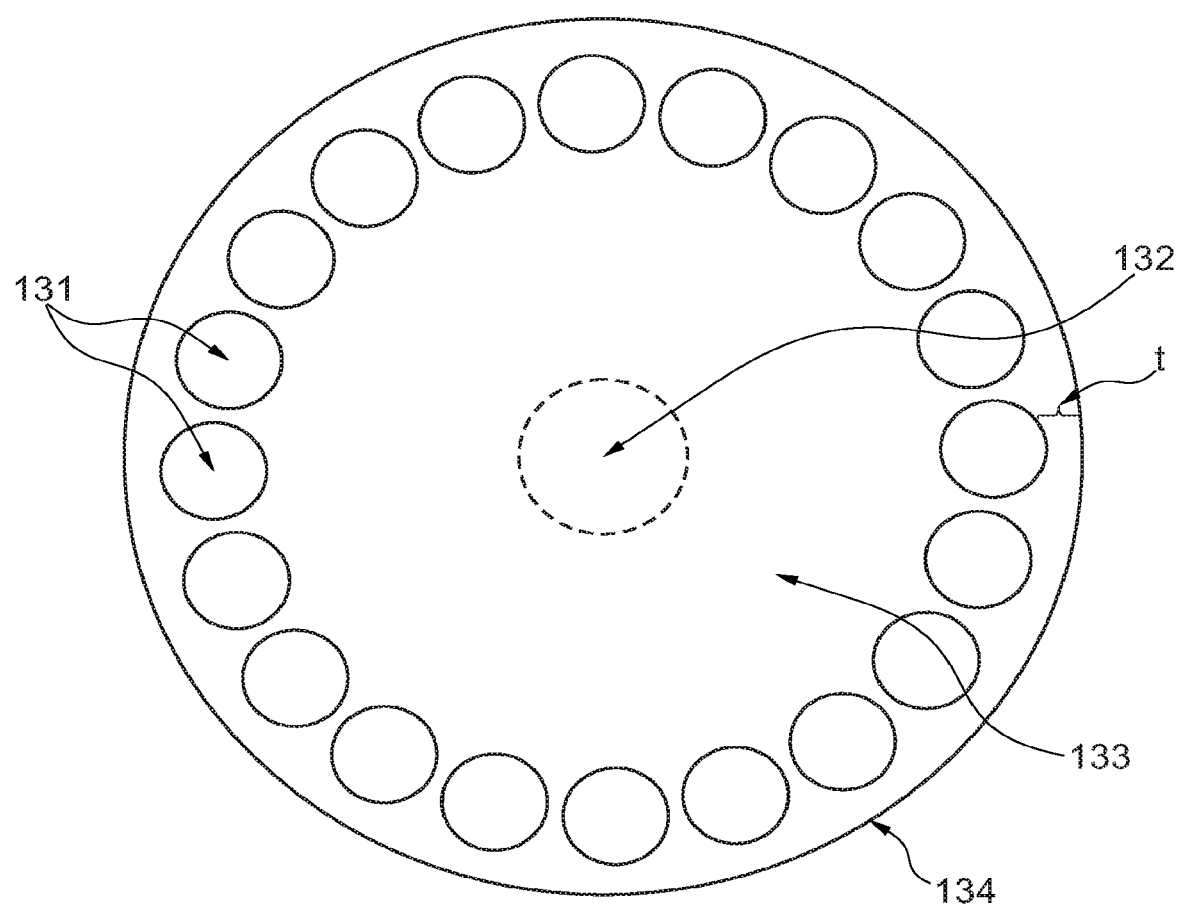
FIG. 15 is a cross-sectional view of a preform center element according to an embodiment of the invention.

The preform center element shown in FIG. 15 comprises a ring of longitudinal holes 131 a cladding region and a core region 132. At a relative short distance—e.g. as described above—to a not shown end of the preform center element the preform center element comprises an annular slot intersecting holes 131. At a position between the slot and the first end or at the first end of the preform center element the intersected holes are closed for example using epoxy or another method as described above. The pressure within the longitudinal holes 131 may thereby be controlled via the slot during drawing of a preform assembly comprising preform center element to an optical fiber.

The preform center element shown in FIG. 15 comprises a ring of longitudinal holes 131 a cladding region and a core region 132. At a relative short distance—e.g. as described above—to a not shown end of the preform center element the preform center element comprises an annular slot intersecting holes 131. At a position between the slot and the first end or at the first end of the preform center element the intersected holes are closed for example using epoxy or another method as described above. The pressure within the longitudinal holes 131 may thereby be controlled via the slot during drawing of a preform assembly comprising preform center element to an optical fiber. The core region 132 may e.g. be a doped core region and/or the cladding region 133 may e.g. be doped and/or comprising microstructures e.g. solid microstructure and/or in the form of longitudinal holes which are not intersected by the slot. Such longitudinal holes not intersected by the slot may be pressure controlled from the first end of the preform assembly e.g. as described above e.g. in connection with FIG. 7b.

During preform assembling the preform center element is assembled with at least an overcladding tube and optionally one or more additional preform ring elements between the preform center element and the overcladding tube.

As it can be seen the distance (material thickness t) from the outer preform element surface 134 to the longitudinal holes 131 is relatively short which reduces the risk of damaging the preform center element during the cutting of the slot. The required thickness radially outwards to the longitudinal holes to provide the final fiber with low undesired leakage of light is thus provided by the overcladding tube and optionally additional preform ring element(s).

Figure 16:
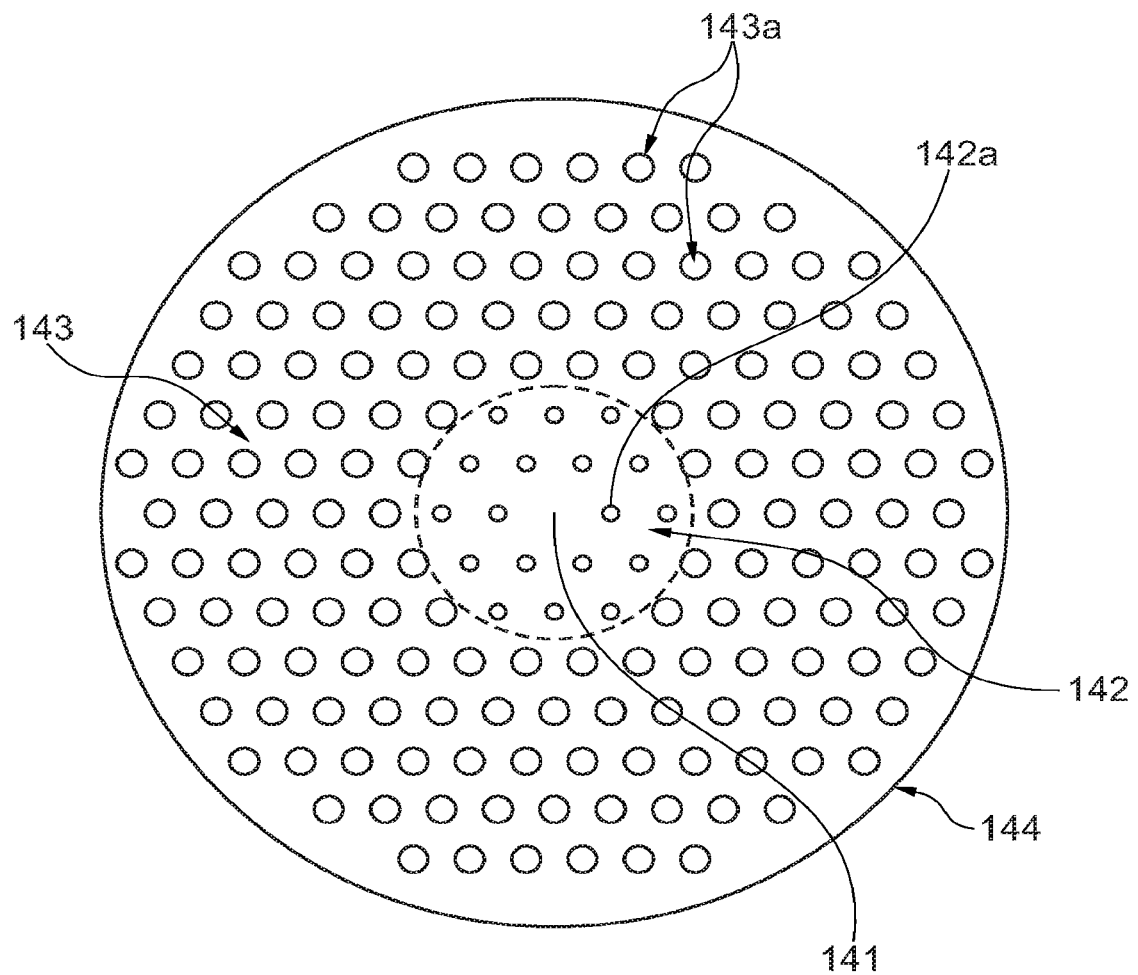
FIG. 16 is a cross-sectional view of a preform center element according to another embodiment of the invention.

The preform center element shown in FIG. 16 comprises a preform core region 141, a preform inner cladding region 142 and a preform outer cladding region 143. The preform inner cladding region 142 comprises hexagonally arranged inner cladding longitudinal holes 142a and the preform outer cladding region 143 comprises hexagonally arranged outer cladding longitudinal holes 143a.

At a relative short distance—e.g. as described above—to a not shown end of the preform center element the preform center element comprises an annular slot intersecting the outer cladding longitudinal holes 143a. the dotted circle indicated the depth of the slot extending from the preform element outer surface 144, such that the inner cladding longitudinal holes 142a are not intersected At a position between the slot and the first end or at the first end of the preform center element the intersected holes 143a are closed for example using epoxy or another method as described above. The pressure within the intersected longitudinal holes 143a may thereby be controlled via the slot during drawing of a preform assembly comprising preform center element to an optical fiber. The pressure within the not intersected longitudinal holes 142a may be controlled via their opening at the first end of the preform center element as described above e.g. in connection with FIG. 7b.

The core region 141 may or may not be doped e.g. in the form of doped or non-doped silica.

During preform assembling the preform center element is assembled with at least an overcladding tube and optionally one or more additional preform ring elements between the preform center element and the overcladding tube.

As it can be seen the distance (material thickness t) from the outer preform element surface 144 to the intersected longitudinal holes 143a is relatively short which reduces the risk of damaging the preform center element during the cutting of the slot. The required thickness t radially outwards to the longitudinal holes to provide the final fiber with low undesired leakage of light is thus provided by the overcladding tube and optionally additional preform ring element(s).

Figure 17:
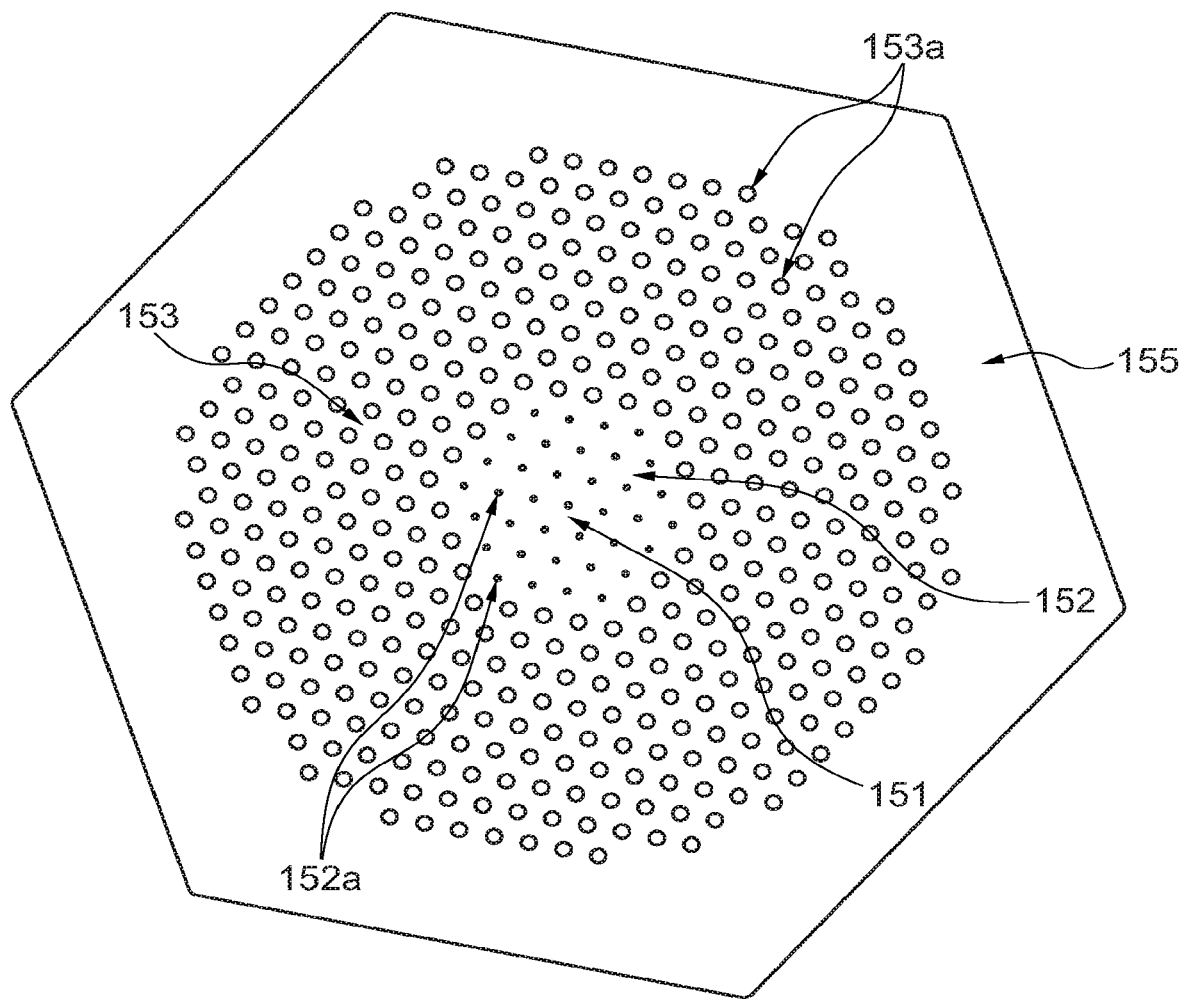
FIGS. 17 and 18 are cross-sectional views of drawn microstructured optical fibers from preform assemblies, each comprising a preform center element according to an embodiment of the invention.

The optical fiber shown in a cross-sectional view in FIG. 17 is drawn from a preform assembly comprising a preform center element corresponding to the preform center element shown in FIG. 16 but where the number off longitudinal holes differs. The optical fiber comprises a core region 151, an inner cladding region 152 and an outer cladding region 153. The inner cladding region 152 comprises hexagonally arranged inner cladding longitudinal holes 152a and the outer cladding region 153 comprises hexagonally arranged outer cladding longitudinal holes 153a. A relatively thick silica layer 155 surrounds the outer cladding region 153. The image only show a part of the silica layer 155. The actually thickness of the silica layer 155 is about 5 times thicker than shown and provides the optical with a round outer periphery. The major part of the silica layer 155 originates from an overcladding tube which is fully fused to the preform center element during the drawing of the fiber.

Figure 18:
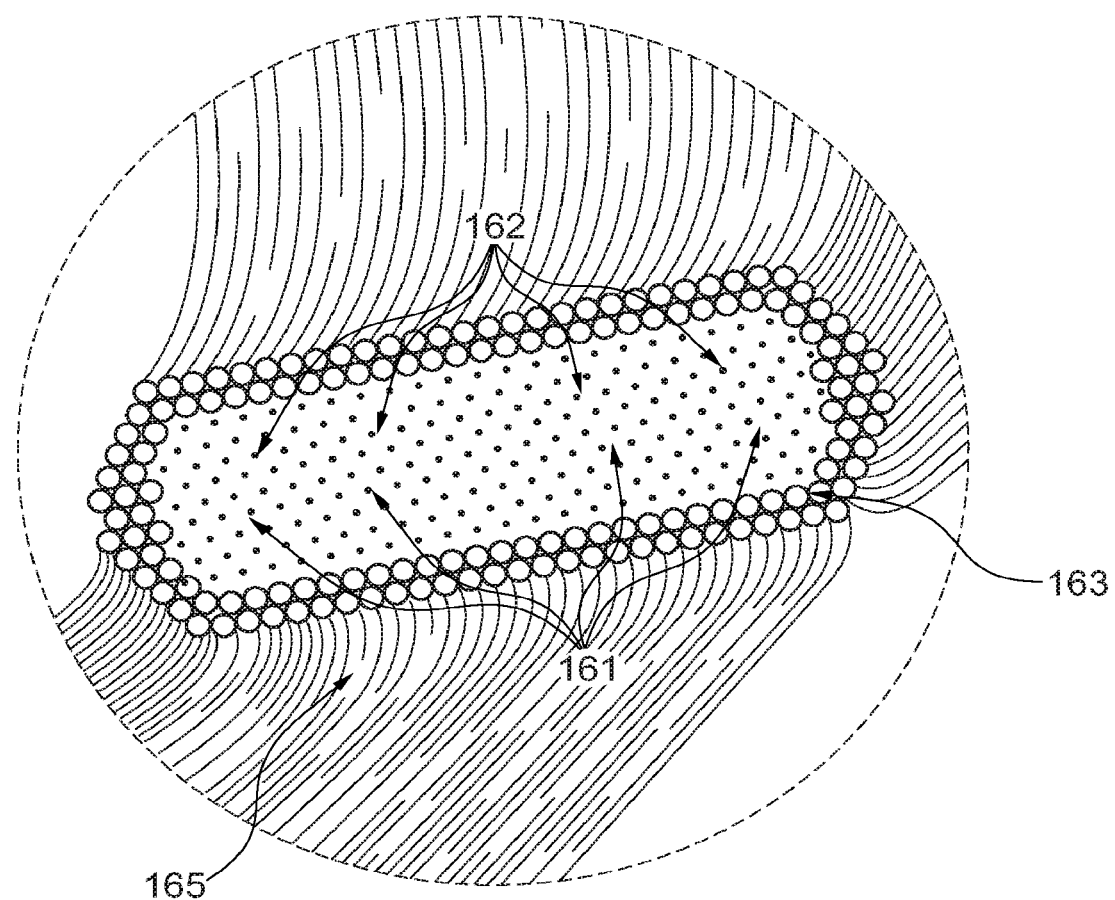

The optical fiber shown in a cross-sectional view in FIG. 18 is drawn from a preform assembly comprising a preform center element according to an embodiment of the invention. The optical fiber comprises 4 core regions 161 surrounded by 4 partially overlapping cladding regions 162 and an air cladding 163. The 4 partially overlapping cladding regions 162 comprises cladding region holes 162a arranges in hexagonal patterns around each of the 4 core region 161. The air cladding comprises a double layer of air cladding holes arranged in a ring with an octagonal shape. The octagonal shape of the air cladding 163 is provided to ensure single mode transmission in the optical fiber while at the same time having a few as possible holes in the cladding region 162. Further it has been found that the octagonal shape of the air cladding 163 may make the stacking of longitudinal structures of the preform center element simpler. A relatively thick silica layer 165 surrounds the air cladding 163. The image only show a part of the silica layer 165. The actually thickness of the silica layer 165 is about 2-5 times thicker than shown and provides the optical with a round outer periphery. The major part of the silica layer 155 originates from an overcladding tube which is fully fused to the preform center element during the drawing of the fiber. The core regions 161, the cladding regions 162 and the air cladding originate from the preform center element where the slot of the preform center element intersects the hollow tubes forming the air cladding 163.

Embodiments

1. A preform element for a fiber preform, said preform element has a length and a center axis along its length, a first and second end defined by its length and an outer preform element surface and said preform element comprising a plurality of longitudinal structures disposed to form longitudinal hole(s) in a background material, said preform element comprises at least one slot extending from its outer preform element surface and intersecting at least one of said longitudinal holes and wherein the at least one slot does not fully intersect the preform element, preferably said plurality of longitudinal structures are encaged in and/or forms said background material and extending in the length direction of the preform element, wherein one or more of said plurality of longitudinal structures form(s) said longitudinal hole(s), preferably at least a part of the background material is provided by solid longitudinal structures and/or by material of hollow longitudinal structures.

2. The preform element of embodiment 1, wherein one or more of said plurality of longitudinal structures are hollow tubes with said longitudinal holes and/or said longitudinal holes are longitudinal interspace holes formed between said longitudinal structures, wherein said least one slot extending from its outer preform element surface intersects at least one of said holes of said hollow tubes and/or at least one of said interspace holes.

3. The preform element of embodiment 1 or embodiment 2, wherein said background material is glass, such as silica glass, soft glass chalcogenide glass or any combinations thereof, optionally the background material comprises one or more dopants, such as one or more, index-changing dopants, such as Ge, B, F, P, Al and/or one or more active material dopants, such as the rare-earth elements Er or Yb.

4. The preform element of any one of the preceding embodiments, wherein the longitudinal structures are arranged substantially parallel to the center axis of the preform element, preferably said preform element comprises at least one ring of hollow tubes.

5. The preform element of any one of the preceding embodiments, wherein the hollow tubes each comprise a plurality of longitudinal holes substantially parallel to the center axis of the preform element, said plurality of holes of each hollow tube are preferably arranged in a predetermined cross sectional pattern comprising at least one ring of holes and optionally a center hole.

6. The preform element of any one of the preceding embodiments, wherein the hollow tubes are of glass, such as silica glass, soft glass chalcogenide glass or any combinations thereof, optionally the hollow tube glass comprises one or more dopants, such as one or more, index-changing dopants, such as Ge, B, F, P, Al and/or one or more active material dopants, such as the rare-earth elements Er or Yb.

7. The preform element of any one of the preceding embodiments, wherein said preform element has n fold rotational symmetry with respect to rotations about its center axis, wherein n is up to 500, such as up to 100, such as up to 50, such as from 2 to 20.

8. The preform element of any one of the preceding embodiments, wherein said longitudinal structures extend in substantially the entire length of the preform element.

9. The preform element of any one of the preceding embodiments, wherein said at least one slot is in the form of a radially inwards cut in the preform element from its outer preform element surface, wherein the radially inwards cut is substantially perpendicular to the center axis.

10. The preform element of any one of the preceding embodiments, wherein said at least one slot is positioned at a distance from the first end of the preform element which is preferably up to 1/10 of the length of the preform element, said distance is preferably at least about 0.5 mm or longer, at least about 5 mm or longer, such as about 1 cm to about 20 cm.

11. The preform element of any one of the preceding embodiments, wherein said intersected holes are closed at a position from the slot to the first end, such as at said first end of the preform and/or at the intersection towards the first end and/or a position there between.

12. The preform element of any one of the preceding embodiments, wherein said preform element is adapted to form part of a preform for a microstructured optical fiber, wherein said preform element is adapted for being assembled with at least one additional preform element.

13. The preform element of any one of the preceding embodiments, wherein the distance from said outer preform element surface to an radially outermost of said at least one intersected hole is less than about 1/8 of the preform element diameter, such as less than about 1/10 of the preform diameter, such as less than 1 cm, such as less than about 0.5 cm, such as less than about 3 mm.

14. The preform element of any one of the preceding embodiments, wherein the preform element is a preform center element comprising at least a preform core region and a preform cladding region surrounding the preform core region, wherein said plurality of longitudinal structures forming said longitudinal holes are disposed in said preform cladding region, said holes are preferably arranged in a cross-sectional hexagonal or octagonal pattern.

15. The preform element of embodiment 14, wherein the preform cladding region comprises an inner preform cladding region surrounding the preform core region and an outer preform cladding region surrounding the inner preform cladding region, wherein said plurality of longitudinal structures forming said longitudinal holes are disposed in said outer preform cladding region.

16. The preform element of embodiment 14 or embodiment 15, wherein the plurality of longitudinal structures are disposed to form a ring of longitudinal holes in said preform cladding region, preferably said ring of longitudinal holes are adapted for providing an air cladding in a fiber drawn from a preform comprising said preform element.

17. The preform element of any one of the preceding embodiments, wherein the at least one slot is an annular slot intersecting a plurality of said holes of said hollow tubes and/or all of said interspace holes, preferably, such as substantially all of said holes of said hollow tubes and/or all of said interspace holes of the preform cladding region or the outer preform cladding region are intersected by said annular slot.

18. The preform element of any one of embodiments 1-13, wherein said preform element is a preform ring element comprising wherein said preform ring element has an inner preform element surface and said outer preform surface is in the form of an outer preform ring element surface, said background material is in the form of a ring wall background material, said slot intersecting said at least one of said longitudinal holes extending from its outer preform element surface and wherein the at least one slot does not fully intersect the ring wall.

19. The preform element of embodiment 18, wherein said ring wall background material comprises a ring wall inner background material and a ring wall outer background material, which inner and outer background material may be equal or may different from each other.

20. The preform element of any one embodiments 18 and 19, wherein said preform ring element comprises a ring of said longitudinal structures arranged with interspace between adjacent longitudinal structures to form said one or more longitudinal interspace holes, said longitudinal structures encaged in the ring wall background material optionally comprises one or more solid structures, such as at least one solid structure having a refractive index different from an index of the ring wall background material.

21. The preform element of any one of embodiments 18-20, wherein said preform ring element comprises a ring of hollow tubes, preferably the hollow tubes each comprise a plurality of longitudinal holes substantially parallel to the center axis of the preform ring element, said plurality of holes of each hollow tube are preferably arranged in a predetermined cross sectional pattern comprising at least one ring of holes and optionally a center hole.

22. The preform element of any one embodiments 18-21, wherein said ring wall has a substantially identical thickness along its annular extension at least in a cross section, preferably in its whole length, more preferably said preform ring element is substantially circular symmetrical around its center axis with respect to thickness.

23. The preform element of any one of the embodiments 18-22, wherein said ring wall has an average inner diameter (ID) defined by the inner preform element surface and an average outer diameter (OD) defined by said outer preform element surface, said ID/OD in at least a cross section of the preform ring element is from about 0.3 to about 0.95, such as from about 0.7 to about 0.9. 24. The preform element of embodiment 23, wherein said ID and said OD are substantially constant along the length of the preform ring element, preferably the thickness of the preform ring element defined by 0.5 times OD minus ID is from about 0.3 mm to about 2 cm, such as from about 1 mm to about 1 cm, such as from about 3 mm to about 6 mm.

25. The preform element of any one of the embodiments 18-24, wherein said ring wall comprises an inner hollow cane, an outer hollow cane and said plurality of longitudinal structures encaged between said inner cane and said outer cane.

26. The preform element of embodiment 25, wherein the inner hollow cane has an inner cane wall thickness and said outer cane has an outer cane wall thickness, wherein said inner cane wall thickness and said outer cane wall thickness independently of each other are from about 1 mm to about 1 cm, such as from about 2 mm to about 5 mm.

27. The preform element of any one of the embodiments 18-26, wherein said plurality of longitudinal structures are arranged in a side by side configuration along the ring shape of the ring shaped wall to form at least one ring of longitudinal structures, said ring of longitudinal structures comprises a plurality of said longitudinal holes intersected by said at least one slot, optionally said plurality of longitudinal structures are arranged to form at least two rings of longitudinal structures, such as three rings of longitudinal structures.

28. The preform element of any one of the embodiments 18-27, wherein the at least one slot is an annular slot intersecting a plurality, such as substantially all of said holes of said hollow tubes and/or all of said interspace holes.

29. The preform element of any one of the embodiments 18-28, wherein said preform ring element has an inner diameter of at least about 3 mm, such as at least about 5 mm, such as at least about 10 mm, such as from about 15 to about 50 mm.

30. The preform element of any one of the preceding embodiments, wherein said preform element is obtainable by a method of any one of embodiments 31-51

31. A method of producing a preform element of any one of the preceding embodiments, wherein said method comprises providing a plurality of longitudinal structures and disposing said longitudinal structures to form longitudinal hole(s) in a background material said method comprises providing at least one slot extending from said outer preform element surface and intersecting at least one of said longitudinal holes and wherein the at least one slot does not fully intersect the preform element.

32. The method of embodiment 31, wherein the method comprises, wherein said method comprises arranging said longitudinal structures to provide said plurality of longitudinal holes substantially parallel to the center axis of the preform element.

33. The method of embodiment 31 or embodiment 32, wherein the method comprising providing said at least one slot is in the form of a radially inwards cut in the preform element from its outer preform element surface, wherein the radially inwards cut is substantially perpendicular to the center axis.

34. The method of any one of embodiments 31-33, wherein said at least one slot is provided at a distance from the first end of the preform element which is preferably up to ¹⁄₁₀ of the length of the preform element, said distance is preferably at least about 0.5 mm or longer, at least about 5 mm or longer, such as about 1 cm to about 20 cm.

35 The method of any one of embodiments 31-34, wherein the method further comprises closing said intersected holes at a position from the first end of the preform to the intersection, such as at the first end of the preform and/or at the intersection towards the first end of the preform and/or at an additional slot intersecting the holes, said intersected holes are preferably closed by collapsing and/or by filling a solid material into the holes.

36. The method of any one of embodiments 31-35, wherein said method comprises stacking said longitudinal structures and optionally arranging the stacked longitudinal structures in an outer cane. 37. The method of any one of embodiments 31-36, wherein said preform element is a preform center element and the method comprises stacking said longitudinal structures to form at least said preform core region and said preform cladding region surrounding the preform core region, wherein said plurality of longitudinal structures forming said longitudinal holes are disposed in said preform cladding region, preferably the method comprises arranging said holes in a cross-sectional hexagonal or octagonal pattern.

38. The method of embodiment 37, wherein the method comprises arranging said longitudinal structures to form said preform cladding region to comprise an inner preform cladding region surrounding the preform core region and an outer preform cladding region surrounding the inner preform cladding region.

39. The method of embodiment 37 or embodiment 38, wherein the method comprises disposing said plurality of longitudinal structures to form a ring of longitudinal holes in said preform cladding region, preferably said ring of longitudinal holes are adapted for providing an air cladding in a fiber drawn from a preform comprising said preform element.

40. The method of any one of embodiments 31-39, wherein the method comprises performing said at least one slot is an annular slot intersecting a plurality of said holes of said hollow tubes and/or all of said interspace holes, preferably, such as half of or substantially all of said holes of said hollow tubes and/or all of said interspace holes of the preform cladding region or the outer preform cladding region are intersected by said annular slot.

41. The method of any one of embodiments 31-36, wherein said preform element is a preform ring element, said method comprises providing an outer ring wall section, an inner ring wall section and a plurality of longitudinal structures and encaging said longitudinal structures in between said outer ring wall section and said inner ring wall section to form longitudinal holes and providing said at least one slot extending through the outer ring wall section and intersecting at least one of said longitudinal holes. 42. The method of embodiment 41, wherein said outer ring wall section is an outer hollow cane and said inner ring wall section is an inner hollow cane, preferably said outer hollow cane has an outer surface forming an outer preform element surface and said method comprises performing said at least one slot extending from the outer preform element surface and intersecting said longitudinal hole(s).

43. The method of embodiment 41 or embodiment 42, wherein said encaging of said at least one longitudinal structure in between said outer ring wall section and said inner ring wall section comprises assembling said outer ring wall section and said inner ring wall section with said longitudinal structures in between and at least partly fusing said outer ring wall section and said inner ring wall section together via said longitudinal structures.

44. The method of any one of embodiments 41-42, wherein said assembling comprises arranging said inner wall section with its outer surface of said inner ring wall to face an inner surface of said outer ring wall and arranging said longitudinal structures between said outer surface of said inner ring wall and said inner surface of said outer ring wall.

45. The method of any one of embodiments 41-44, wherein the inner and outer ring wall sections are hollow canes and the assembling comprises inserting said inner ring wall section into said outer ring wall section and arranging a plurality of said longitudinal structures between said inner ring wall section and said outer ring wall section.

46. The method of any one of embodiments 41-45, wherein the method comprises arranging said longitudinal structures in a side by side configuration to surround said inner ring wall section, to form at least one ring of longitudinal structures, such as two rings of longitudinal structures, such as three rings of longitudinal structures.

47. The method of any one of embodiments 41-46, wherein one or more of said plurality of longitudinal structures are hollow tubes with said longitudinal holes and/or said longitudinal holes are longitudinal interspace holes between said longitudinal structures, wherein said least one slot is provided to intersects at least one of said holes of said hollow tubes and/or at least one of said interspace holes, preferably all of said longitudinal structures are hollow tubes optionally including one or more tubes with a plurality of longitudinal holes substantially parallel to the center axis of the preform ring element.

48. The method of embodiment 46 or embodiment 47, wherein the ring of longitudinal structures is arranged in a configuration where said respective longitudinal structures are in contact with adjacent longitudinal structures along their lengths.

49. The method of embodiment 46 or embodiment 47, wherein the ring of longitudinal structures is arranged in a configuration where said respective longitudinal structures are not in contact with adjacent longitudinal structures thereby forming said longitudinal holes in the form of interspace longitudinal holes, preferably the method comprises arranging a distance arrangement at two or more positions along the length of the preform ring element for controlling the distance between the longitudinal structures.

50. The method of any one of embodiments 41-49, wherein said at least one slot is provided by a radially inwards cut through the outer ring wall section, wherein the radially inwards cut is substantially perpendicular to the center axis.

51. The method of any one of embodiments 41-49, wherein the method further comprises closing said intersected holes at a position from the first end of the preform to the intersection, such as at the first end of the preform and/or at the intersection towards the first end of the preform and/or at an additional slot intersecting the holes, said intersected holes are preferably closed by collapsing and/or by filling a solid material into the holes.

52. A method of producing a microstructured optical fiber, the method comprising assembling a preform, and drawing the preform assembly to a microstructured optical fiber, wherein the assembling of the preform comprises providing a preform element according to any one of the embodiments 1-22 and assembling it with at least one additional preform element.

53. The fiber production method of embodiment 52, wherein the at least one additional preform element is an overcladding tube with a length and a first and a second end and a bore and the preform assembling comprises disposing said preform element into said bore of said overcladding tube to form a preform element-overcladding tube interface, wherein the preform assembly has a first end section comprising said first end of said preform element and said first end of said overcladding tube.

54. The fiber production method of embodiment 52 or embodiment 53, wherein said preform element is a preform center element which is assembled with an additional preform ring element and/or an overcladding tube or wherein said preform element is a preform ring element which is assembled with an additional preform center element and optionally an overcladding tube.

55. The fiber production method of embodiment 54 wherein the method comprises providing a preform center element with a length and a first and a second end, and arranging the ring shaped wall to surround said preform center element to form a preform ring element-preform center interface, wherein the preform assembly has a first end section comprising said first end of said preform center element and said first end of said preform ring element.

56. The fiber production method of embodiment 55, wherein said preform center element is a preform center element according to any one of embodiments 1-17.

57. The fiber production method of embodiment 56, wherein the assembling of the preform comprises providing an additional preform element in the form of an overcladding tube with a length and a first and a second end and a bore and arranging said ring shaped wall into said bore of said overcladding tube to form a preform ring element-overcladding tube interface, wherein the preform assembly has a first end section comprising said first end of said preform center element, said first end of said preform ring element and said first end of said overcladding tube.

58. The fiber production method of any one of embodiments 52-57, wherein at least one of said elements interface(s) is subjected to a reduced pressure during at least a part of the drawing of the preform assembly to a microstructured optical fiber, preferably at least one of said preform element-overcladding tube interface and said preform ring element-preform center interface is/are subjected to a reduced pressure during at least a part of the drawing of the preform assembly to a microstructured optical fiber, wherein said preform element-overcladding tube interface is selected from a preform center element-overcladding tube interface and a preform ring element-overcladding tube interface 59. The fiber production method of any one of embodiments 52-58, wherein the preform center element comprises at least one hole extending along its length, said method comprising subjecting said at least one hole of said preform center element to a preform center controlled pressure during the drawing, preferably the preform center element is according to any one of embodiments 1-17 and the controlled pressure is applied via the slot of the preform center element.

60. The fiber production method of any one of embodiments 52-59, wherein the preform center element comprises at least a first category hole and at least a second category hole extending in length of the preform center element, said method comprising subjecting said at least one first category hole to a first preform center controlled pressure and subjecting said at least one second category hole to a second preform center controlled pressure during the drawing.

61. The fiber production method of any one of embodiments 55-60, wherein the method comprises subjecting said longitudinal holes of said preform ring element to a preform ring element controlled pressure during the drawing, wherein said preform ring element controlled pressure is controlled independently of at least one other controlled pressure during the drawing, such as said preform center controlled pressure. 62. The fiber production method of any one of embodiments 55-61, wherein the method comprises subjecting said longitudinal holes of said preform ring element intersected by said slot to a preform ring element controlled pressure during the drawing, wherein said preform ring element controlled pressure is applied via said slot.

63. The fiber production method of any one of embodiments 52-62, wherein said first end of said preform center element and said first end of said overcladding tube are sequentially offset at said preform end section, such that said end section of said preform center element protrudes beyond the end of said overcladding tube.

64. The fiber production method of any one of embodiments 54-63, wherein said first end of said additional preform center element, said first end of said preform ring element and said first end of said overcladding tube are sequentially offset at said preform end section, such that said end section of said preform ring element protrudes beyond the end of said overcladding tube and preferably such that an end section of said additional preform center element protrudes beyond the end of said preform ring element.

65. The fiber production method of any one of embodiments 55-64, wherein said first end of said preform center element, said first end of said additional preform ring element and said first end of said overcladding tube are sequentially offset at said preform end section, such that said end section of said additional preform ring element protrudes beyond the end of said overcladding tube and preferably such that an end section of said preform center element protrudes beyond the end of said additional preform ring element.

66. The fiber production method of any one of embodiments 51-65, wherein said one or more pressure controls are provided by enclosing said end section of said preform assembly by a pressure control cap comprising two or more pressure control sections and applying seals to seal off independently pressure controlled holes, comprising at least a pair of slot seals on opposite sides of said slot of said preform element, preferably said intersected holes of said preform element are closed at a position from said first end of the preform to said slot intersection towards the first end and said pair of slot seals forms annular seals against the outer preform element surface of said end section of said preform element.

67. The fiber production method of any one of embodiments 51-66, wherein the drawing of said preform assembly comprises drawing of the preform assembly to said microstructured optical fiber in a drawing tower, wherein the preform assembly is subjected to at least one pressure control at its first end section, preferably two or more independently controlled pressure controls.

68. A method of forming an optical fiber comprising:
forming an optical fiber preform assembly comprising at least one interface void and comprising a plurality of longitudinal holes and one or more longitudinally extending voids; and
drawing the optical fiber preform assembly into the optical fiber while pressuring at least one of the holes through a radially inwardly extending slot in the preform assembly and while evacuating said at least one interface void.

69. The fiber production method of embodiment 68, wherein the method is according to any one of the embodiments 51-67.

70. The fiber production method of embodiment 68 or embodiment 69, wherein, the method comprises drawing the optical fiber, such that the at least one interface void is closed in the drawn fiber.

The invention claimed is:

1. A preform assembly for a microstructured optical fiber, the preform assembly comprising:
a preform center element;
a preform ring element;
wherein the preform ring element is a hollow cane comprising a ring-wall background material that defines a ring-wall, wherein the hollow cane has a cane-length, a first cane-end, and a second cane-end, wherein the hollow cane further has a first inner surface with an average inner diameter, and a first outer surface with an average outer diameter, such that a distance from the average inner diameter to the average outer diameter defines a thickness of the ring-wall, wherein the ring-wall background material comprises a first plurality of longitudinal holes along the cane-length;
wherein the preform center element comprises a center-structure that has a center-length, a first center-end, and a second center-end, wherein the center structure comprises a second outer surface with an average cross-sectional diameter less than the average inner diameter of the preform ring element resulting in one or more gaps between the second outer surface of the preform center element and the first inner surface of the preform ring element; and
wherein the preform ring element further comprises at least one first slot in the outer surface of the ring wall positioned at a distance from the first cane-end of the preform ring element, wherein the distance is at least 5 mm.

2. The preform assembly of claim 1, wherein the at least one first slot has a depth less than or equal to the thickness of the ring-wall.

3. The preform assembly of claim 2, wherein the at least one first slot intersects at least one of the first plurality of longitudinal holes.

4. The preform assembly of claim 3, wherein the at least one first slot is configured to transfer fluid into the intersected at least one of the first plurality of longitudinal holes.

5. The preform assembly of claim 3, wherein the intersected at least one of the first plurality of longitudinal holes is closed at the first cane-end.

6. The preform assembly of claim 3, wherein the intersected at least one of the first plurality of longitudinal hole is closed at the second cane-end.

7. The preform assembly of claim 2, wherein the at least one first slot is at least one cut in the first outer surface.

8. The preform assembly of claim 1, wherein the cane-length of the preform ring element is between 50 cm to 150 cm.

9. The preform assembly of claim 1, wherein the center element comprises a second plurality of longitudinal holes along the center-length.

10. The preform assembly of claim 9, wherein the second plurality of longitudinal holes form a ring of longitudinal holes.

11. The preform assembly of claim 9, wherein the preform center element comprises at least one second slot in the second outer surface of the center-structure, wherein the at least one second slot intersects at least one of the second plurality of longitudinal holes.

12. The preform assembly of claim 1, wherein the preform center element further comprises a center longitudinal hole in the center of the center-element.

13. The preform assembly of claim 1 further comprising one or more additional preform ring elements comprising an additional ring-wall having an additional plurality of longitudinal holes, wherein the one or more additional preform ring elements are configured to be assembled inside the preform ring element, and further configured to surround the preform center element.

14. The preform assembly to claim 1 further comprising a first overcladding tube that surrounds the preform center element, wherein the first overcladding tube has a first tube length.

15. The preform assembly of claim 1 further comprising a second overcladding tube to surround the preform ring element, wherein the second overcladding tube has a second tube length.

16. A method of producing a microstructured fiber, the method comprising:
assembling a preform assembly, the preform assembly comprising:
a preform center element;
a preform ring element;
wherein the preform ring element is a hollow cane comprising a ring-wall background material that defines a ring-wall, wherein the hollow cane has a cane-length, a first cane-end, and a second cane-end, wherein the hollow cane further has a first inner surface with an average inner diameter, and a first outer surface with an average outer diameter, such that a distance from the average inner diameter to the average outer diameter defines a thickness of the ring-wall, wherein the ring-wall background material comprises a first plurality of longitudinal holes along the cane-length;
wherein the preform center element comprises a center-structure that has a center-length, a first center-end, and a second center-end, wherein the center structure comprises a second outer surface with an average cross-sectional diameter less than the average inner diameter of the preform ring element resulting in one or more gaps between the second outer surface of the preform center element and the first inner surface of the preform ring element; and
at least one first slot in the preform ring element that intersects at least one of the first plurality of longitudinal holes and that is configured to transfer fluid into the intersected at least one of the first plurality of longitudinal holes; and
transferring fluid into the at least one of the first plurality of longitudinal holes by controlling a first pressure of the fluid; and
drawing the preform assembly to the microstructured fiber.

17. The method according to claim 16, wherein the center element of the preform assembly further comprises a second plurality of longitudinal holes along the center-length and the preform center element further comprises at least one second slot in the second outer surface of the center-structure, wherein the at least one second slot intersects at least one of the second plurality of longitudinal holes, and the method further comprises transferring fluid into the at least one of the second plurality of longitudinal holes by controlling a second pressure of the fluid, wherein the second pressure is controlled independently of the first pressure.

18. The method according to claim 17, wherein the first pressure is controlled via a first chamber, and wherein the second pressure is controlled via a second chamber.

19. The method according to claim 16, wherein the one or more gaps of the assembled preform assembly are removed during the step of drawing the preform assembly.

* * * * *